US008184155B2

(12) United States Patent
Ke et al.

(10) Patent No.: US 8,184,155 B2
(45) Date of Patent: May 22, 2012

(54) RECOGNITION AND TRACKING USING INVISIBLE JUNCTIONS

(75) Inventors: Qifa Ke, Cupertino, CA (US); Jonathan J. Hull, San Carlos, CA (US)

(73) Assignee: Ricoh Co. Ltd., Tokyo (JP)

( * ) Notice: Subject to any disclaimer, the term of this patent is extended or adjusted under 35 U.S.C. 154(b) by 1258 days.

(21) Appl. No.: 11/776,530

(22) Filed: Jul. 11, 2007

(65) Prior Publication Data

US 2009/0015676 A1    Jan. 15, 2009

(51) Int. Cl.
*G06K 9/34* (2006.01)
(52) U.S. Cl. .......... 348/142; 382/180; 382/174
(58) Field of Classification Search .......... 348/169, 348/142; 382/180, 174
See application file for complete search history.

(56) References Cited

U.S. PATENT DOCUMENTS

| | | | |
|---|---|---|---|
| 1,915,993 A | 6/1933 | Handel | |
| 4,759,075 A * | 7/1988 | Lipkie et al. | 382/288 |
| 5,027,421 A | 6/1991 | Kanno | |
| 5,035,302 A | 7/1991 | Thangavelu | |
| 5,077,805 A | 12/1991 | Tan | |
| 5,109,439 A | 4/1992 | Froessl | |
| 5,263,100 A | 11/1993 | Kim et al. | |
| 5,392,447 A | 2/1995 | Schlack et al. | |
| 5,416,892 A | 5/1995 | Loken-Kim | |
| 5,432,864 A | 7/1995 | Lu et al. | |
| 5,465,353 A | 11/1995 | Hull et al. | |
| 5,493,689 A | 2/1996 | Waclawsky et al. | |
| 5,546,502 A | 8/1996 | Hart et al. | |
| 5,553,217 A | 9/1996 | Hart et al. | |
| 5,555,556 A | 9/1996 | Ozaki | |
| 5,579,471 A | 11/1996 | Barber et al. | |
| 5,706,097 A | 1/1998 | Schelling et al. | |

(Continued)

FOREIGN PATENT DOCUMENTS

CN          1245935           3/2000

(Continued)

OTHER PUBLICATIONS

Cover, T.M. et al., "Nearest Neighbor Pattern Classification," IEEE Transactions on Information Theory, Jan. 1967, pp. 21-27, vol. IT-13, No. 1.

(Continued)

*Primary Examiner* — Kevin Bates
(74) *Attorney, Agent, or Firm* — Patent Law Works LLP

(57) ABSTRACT

The present invention uses invisible junctions which are a set of local features unique to every page of the electronic document to match the captured image to a part of an electronic document. The present invention includes: an image capture device, a feature extraction and recognition system and database. When an electronic document is printed, the feature extraction and recognition system captures an image of the document page. The features in the captured image are then extracted, indexed and stored in the database. Given a query image, usually a small patch of some document page captured by a low resolution image capture device, the features in the query image are extracted and compared against those stored in the database to identify the query image. The present invention also includes methods for recognizing and tracking the viewing region and look at point corresponding to the input query image. This information is combined with a rendering of the original input document to generate a new graphical user interface to the user. This user interface can be displayed on a conventional browser or even on the display of an image capture device.

28 Claims, 23 Drawing Sheets

U.S. PATENT DOCUMENTS

| | | | |
|---|---|---|---|
| 5,752,055 A | 5/1998 | Redpath et al. | |
| 5,761,344 A | 6/1998 | Al-Hussein | |
| 5,764,277 A | 6/1998 | Loui et al. | |
| 5,806,005 A | 9/1998 | Hull et al. | |
| 5,832,474 A | 11/1998 | Lopresti et al. | |
| 5,832,530 A | 11/1998 | Paknad et al. | |
| 5,842,194 A | 11/1998 | Arbuckle | |
| 5,873,077 A | 2/1999 | Kanoh et al. | |
| 5,892,843 A | 4/1999 | Zhou et al. | |
| 5,899,999 A | 5/1999 | De Bonet | |
| 5,905,502 A | 5/1999 | Deering | |
| 5,918,012 A | 6/1999 | Astiz et al. | |
| 5,956,468 A | 9/1999 | Ancin | |
| 5,968,175 A | 10/1999 | Morishita et al. | |
| 5,999,915 A | 12/1999 | Nahan et al. | |
| 6,035,055 A | 3/2000 | Wang et al. | |
| 6,104,834 A | 8/2000 | Hull | |
| 6,121,969 A | 9/2000 | Jain et al. | |
| 6,138,129 A | 10/2000 | Combs | |
| 6,192,157 B1 | 2/2001 | Prebble | |
| 6,208,771 B1 | 3/2001 | Jared et al. | |
| 6,223,171 B1 | 4/2001 | Chaudhuri et al. | |
| 6,253,201 B1 | 6/2001 | Abdel-Mottaleb et al. | |
| 6,301,386 B1 | 10/2001 | Zhu et al. | |
| 6,332,039 B1 | 12/2001 | Bando et al. | |
| 6,345,274 B1 | 2/2002 | Zhu et al. | |
| 6,353,822 B1 | 3/2002 | Lieberman | |
| 6,363,381 B1 | 3/2002 | Lee et al. | |
| 6,393,142 B1 | 5/2002 | Swain et al. | |
| 6,397,213 B1 | 5/2002 | Cullen et al. | |
| 6,405,172 B1 | 6/2002 | Baker et al. | |
| 6,408,257 B1 | 6/2002 | Harrington et al. | |
| 6,411,953 B1 | 6/2002 | Ganapathy et al. | |
| 6,448,979 B1 | 9/2002 | Schena et al. | |
| 6,457,026 B1 | 9/2002 | Graham et al. | |
| 6,460,036 B1 | 10/2002 | Herz | |
| 6,470,264 B2 | 10/2002 | Bide | |
| 6,504,571 B1 | 1/2003 | Narayanaswami et al. | |
| 6,537,324 B1 | 3/2003 | Tabata et al. | |
| 6,567,799 B2 | 5/2003 | Sweet et al. | |
| 6,574,375 B1 | 6/2003 | Cullen et al. | |
| 6,574,644 B2 | 6/2003 | Hsu et al. | |
| 6,584,223 B1 | 6/2003 | Shiiyama | |
| 6,611,862 B2 | 8/2003 | Riesman | |
| 6,732,915 B1 | 5/2004 | Nelson et al. | |
| 6,751,343 B1 | 6/2004 | Ferrell et al. | |
| 6,753,883 B2 | 6/2004 | Schena et al. | |
| 6,766,363 B1 | 7/2004 | Rothschild | |
| 6,791,605 B1 | 9/2004 | Reele et al. | |
| 6,799,201 B1 | 9/2004 | Lee et al. | |
| 6,804,332 B1 | 10/2004 | Miner et al. | |
| 6,804,659 B1 | 10/2004 | Graham et al. | |
| 6,813,381 B2 | 11/2004 | Ohnishi et al. | |
| 6,824,057 B2 | 11/2004 | Rathus et al. | |
| 6,827,267 B2 | 12/2004 | Rathus et al. | |
| 6,830,187 B2 | 12/2004 | Rathus et al. | |
| 6,834,804 B2 | 12/2004 | Rathus et al. | |
| 6,842,755 B2 | 1/2005 | Maslov | |
| 6,843,411 B2 | 1/2005 | Rathus et al. | |
| 6,859,909 B1 | 2/2005 | Lerner et al. | |
| 6,865,302 B2 | 3/2005 | Chang | |
| 6,866,196 B1 | 3/2005 | Rathus et al. | |
| 6,922,699 B2 | 7/2005 | Schuetze et al. | |
| 6,929,182 B2 | 8/2005 | Rathus et al. | |
| 6,940,491 B2 | 9/2005 | Incertis Carro | |
| 6,963,358 B2 | 11/2005 | Cohen et al. | |
| 6,964,374 B1 | 11/2005 | Djuknic et al. | |
| 6,980,962 B1 | 12/2005 | Arganbright et al. | |
| 6,981,224 B1 | 12/2005 | Gardner et al. | |
| 6,993,573 B2 | 1/2006 | Hunter | |
| 7,013,309 B2 | 3/2006 | Chakraborty et al. | |
| 7,031,965 B1 | 4/2006 | Moriya et al. | |
| 7,051,086 B2 | 5/2006 | Rhoads et al. | |
| 7,089,487 B2 | 8/2006 | Tsai | |
| 7,092,953 B1 | 8/2006 | Haynes | |
| 7,134,095 B1 | 11/2006 | Smith et al. | |
| 7,150,399 B2 | 12/2006 | Barrus et al. | |
| 7,167,574 B2 | 1/2007 | Kim | |
| 7,174,031 B2 * | 2/2007 | Rhoads et al. | 382/107 |
| 7,185,274 B1 | 2/2007 | Rubin et al. | |
| 7,206,820 B1 | 4/2007 | Rhoads et al. | |
| 7,232,057 B2 | 6/2007 | Rathus et al. | |
| 7,236,632 B2 | 6/2007 | Erol et al. | |
| 7,240,279 B1 | 7/2007 | Chartier et al. | |
| 7,249,123 B2 | 7/2007 | Elder et al. | |
| 7,251,689 B2 | 7/2007 | Wesley | |
| 7,263,205 B2 | 8/2007 | Lev | |
| 7,305,435 B2 | 12/2007 | Hamynen | |
| 7,310,769 B1 | 12/2007 | Dash | |
| 7,310,779 B2 | 12/2007 | Carro | |
| 7,337,175 B2 | 2/2008 | Comps et al. | |
| 7,359,094 B1 | 4/2008 | Sayuda | |
| 7,363,580 B2 | 4/2008 | Tabata et al. | |
| 7,366,979 B2 | 4/2008 | Spielberg et al. | |
| 7,386,789 B2 | 6/2008 | Chao et al. | |
| 7,392,287 B2 | 6/2008 | Ratcliff, III | |
| 7,406,214 B2 | 7/2008 | Rhoads et al. | |
| 7,421,153 B1 | 9/2008 | Ronca et al. | |
| 7,421,155 B2 | 9/2008 | King et al. | |
| 7,437,023 B2 | 10/2008 | King et al. | |
| 7,450,760 B2 | 11/2008 | Molnar et al. | |
| 7,458,014 B1 | 11/2008 | Rubin et al. | |
| 7,489,415 B2 | 2/2009 | Furuta et al. | |
| 7,509,386 B2 | 3/2009 | Miyashita | |
| 7,546,524 B1 | 6/2009 | Bryar et al. | |
| 7,567,262 B1 | 7/2009 | Clemens et al. | |
| 7,593,605 B2 * | 9/2009 | King et al. | 382/313 |
| 7,593,961 B2 | 9/2009 | Eguchi et al. | |
| 7,613,686 B2 | 11/2009 | Rui | |
| 7,644,078 B2 | 1/2010 | Sastry et al. | |
| 7,653,238 B2 | 1/2010 | Stentiford | |
| 7,668,405 B2 | 2/2010 | Gallagher | |
| 7,680,850 B2 | 3/2010 | Oda | |
| 7,707,039 B2 | 4/2010 | King et al. | |
| 7,746,376 B2 | 6/2010 | Mendoza et al. | |
| 7,761,436 B2 | 7/2010 | Norton et al. | |
| 7,765,231 B2 | 7/2010 | Rathus et al. | |
| 7,812,986 B2 | 10/2010 | Graham et al. | |
| 7,872,669 B2 | 1/2011 | Darrell et al. | |
| 7,882,113 B2 | 2/2011 | Yaeger | |
| 7,930,292 B2 | 4/2011 | Nakajima | |
| 7,946,491 B2 | 5/2011 | Burian et al. | |
| 2001/0011276 A1 | 8/2001 | Durst, Jr. et al. | |
| 2001/0013546 A1 | 8/2001 | Ross | |
| 2001/0024514 A1 | 9/2001 | Matsunaga | |
| 2001/0042030 A1 | 11/2001 | Ito et al. | |
| 2001/0042085 A1 | 11/2001 | Peairs et al. | |
| 2001/0043741 A1 | 11/2001 | Mahoney et al. | |
| 2001/0049700 A1 | 12/2001 | Ichikura | |
| 2002/0038430 A1 | 3/2002 | Edwards et al. | |
| 2002/0052872 A1 | 5/2002 | Yada | |
| 2002/0054059 A1 | 5/2002 | Schneiderman | |
| 2002/0063709 A1 | 5/2002 | Gilbert et al. | |
| 2002/0073236 A1 | 6/2002 | Helgeson et al. | |
| 2002/0102966 A1 | 8/2002 | Lev et al. | |
| 2002/0118379 A1 | 8/2002 | Chakraborty et al. | |
| 2002/0146176 A1 | 10/2002 | Meyers | |
| 2002/0154148 A1 | 10/2002 | Inoue et al. | |
| 2002/0157028 A1 | 10/2002 | Koue et al. | |
| 2002/0159640 A1 | 10/2002 | Vaithilingam et al. | |
| 2002/0191003 A1 | 12/2002 | Hobgood et al. | |
| 2002/0191848 A1 | 12/2002 | Boose et al. | |
| 2002/0194264 A1 | 12/2002 | Uchiyama et al. | |
| 2003/0025714 A1 | 2/2003 | Ebersole et al. | |
| 2003/0030835 A1 | 2/2003 | Yoshida et al. | |
| 2003/0098877 A1 | 5/2003 | Boegelund | |
| 2003/0110130 A1 | 6/2003 | Pelletier | |
| 2003/0110216 A1 | 6/2003 | Althin et al. | |
| 2003/0112930 A1 | 6/2003 | Bosik et al. | |
| 2003/0121006 A1 | 6/2003 | Tabata et al. | |
| 2003/0122922 A1 | 7/2003 | Saffer et al. | |
| 2003/0126147 A1 | 7/2003 | Essafi et al. | |
| 2003/0128375 A1 | 7/2003 | Ruhl et al. | |
| 2003/0151674 A1 | 8/2003 | Lin | |
| 2003/0152293 A1 | 8/2003 | Bresler et al. | |
| 2003/0187886 A1 | 10/2003 | Hull et al. | |
| 2003/0190094 A1 | 10/2003 | Yokota | |

| | | | | | | |
|---|---|---|---|---|---|---|
| 2003/0193530 A1 | 10/2003 | Blackman et al. | | 2006/0143176 A1 | 6/2006 | Mojsilovic et al. |
| 2003/0212585 A1 | 11/2003 | Kyoya et al. | | 2006/0150079 A1 | 7/2006 | Albornoz et al. |
| 2003/0229857 A1 | 12/2003 | Sayuda et al. | | 2006/0190812 A1 | 8/2006 | Ellenby et al. |
| 2004/0017482 A1 | 1/2004 | Weitman | | 2006/0200480 A1 | 9/2006 | Harris et al. |
| 2004/0027604 A1 | 2/2004 | Jeran et al. | | 2006/0206335 A1 | 9/2006 | Thelen et al. |
| 2004/0036679 A1 | 2/2004 | Emerson | | 2006/0218225 A1 | 9/2006 | Hee Voon et al. |
| 2004/0042667 A1 | 3/2004 | Lee et al. | | 2006/0227992 A1 | 10/2006 | Rathus et al. |
| 2004/0102898 A1 | 5/2004 | Yokota et al. | | 2006/0240862 A1 | 10/2006 | Neven et al. |
| 2004/0122811 A1 | 6/2004 | Page | | 2006/0251292 A1 | 11/2006 | Gokturk et al. |
| 2004/0133582 A1 | 7/2004 | Howard et al. | | 2006/0251339 A1 | 11/2006 | Gokturk et al. |
| 2004/0139391 A1 | 7/2004 | Stumbo et al. | | 2006/0253439 A1 | 11/2006 | Ren et al. |
| 2004/0143644 A1 | 7/2004 | Berton et al. | | 2006/0253491 A1 | 11/2006 | Gokturk et al. |
| 2004/0198396 A1 | 10/2004 | Fransioli | | 2006/0262352 A1 | 11/2006 | Hull et al. |
| 2004/0199531 A1 | 10/2004 | Kim et al. | | 2006/0262962 A1 | 11/2006 | Hull et al. |
| 2004/0201706 A1 | 10/2004 | Shimizu et al. | | 2006/0262976 A1 | 11/2006 | Hart et al. |
| 2004/0205347 A1 | 10/2004 | Erol et al. | | 2006/0285172 A1 | 12/2006 | Hull et al. |
| 2004/0215689 A1 | 10/2004 | Dooley et al. | | 2006/0285755 A1 | 12/2006 | Hager et al. |
| 2004/0221244 A1 | 11/2004 | Baldino | | 2006/0285772 A1 | 12/2006 | Hull et al. |
| 2004/0233235 A1 | 11/2004 | Rubin et al. | | 2006/0286951 A1 | 12/2006 | Nagamoto et al. |
| 2004/0238621 A1 | 12/2004 | Beenau et al. | | 2006/0294049 A1 | 12/2006 | Sechrest et al. |
| 2004/0243514 A1 | 12/2004 | Wankmueller | | 2007/0003166 A1 | 1/2007 | Berkner |
| 2004/0260625 A1 | 12/2004 | Usami et al. | | 2007/0019261 A1 | 1/2007 | Chu |
| 2004/0260680 A1 | 12/2004 | Best et al. | | 2007/0036469 A1 | 2/2007 | Kim et al. |
| 2005/0012960 A1 | 1/2005 | Eden et al. | | 2007/0041668 A1 | 2/2007 | Todaka |
| 2005/0080693 A1 | 4/2005 | Foss et al. | | 2007/0047819 A1* | 3/2007 | Hull et al. ............... 382/190 |
| 2005/0086188 A1 | 4/2005 | Hillis et al. | | 2007/0053513 A1 | 3/2007 | Hoffberg |
| 2005/0086224 A1 | 4/2005 | Franciosa et al. | | 2007/0076922 A1 | 4/2007 | Living et al. |
| 2005/0089246 A1 | 4/2005 | Luo | | 2007/0115373 A1 | 5/2007 | Gallagher et al. |
| 2005/0100219 A1 | 5/2005 | Berkner et al. | | 2007/0150466 A1 | 6/2007 | Brave et al. |
| 2005/0114325 A1 | 5/2005 | Liu et al. | | 2007/0165904 A1 | 7/2007 | Nudd et al. |
| 2005/0125390 A1 | 6/2005 | Hurst-Hiller et al. | | 2007/0174269 A1 | 7/2007 | Jing et al. |
| 2005/0129293 A1 | 6/2005 | Acharya et al. | | 2007/0175998 A1 | 8/2007 | Lev |
| 2005/0135483 A1 | 6/2005 | Nair | | 2007/0233613 A1 | 10/2007 | Barrus et al. |
| 2005/0160115 A1 | 7/2005 | Starkweather | | 2007/0271247 A1 | 11/2007 | Best et al. |
| 2005/0160258 A1 | 7/2005 | O'Shea et al. | | 2007/0276845 A1 | 11/2007 | Geilich |
| 2005/0165747 A1 | 7/2005 | Bargeron et al. | | 2008/0010605 A1 | 1/2008 | Frank |
| 2005/0165784 A1 | 7/2005 | Gomez et al. | | 2008/0071767 A1 | 3/2008 | Grieselhuber et al. |
| 2005/0169520 A1 | 8/2005 | Chen et al. | | 2008/0078836 A1 | 4/2008 | Tomita |
| 2005/0182773 A1 | 8/2005 | Feinsmith et al. | | 2008/0267504 A1 | 10/2008 | Schloter et al. |
| 2005/0185060 A1 | 8/2005 | Neven | | 2008/0275881 A1 | 11/2008 | Conn et al. |
| 2005/0185225 A1 | 8/2005 | Brawn et al. | | 2008/0288476 A1 | 11/2008 | Kim et al. |
| 2005/0190273 A1 | 9/2005 | Toyama et al. | | 2008/0296362 A1 | 12/2008 | Lubow |
| 2005/0190972 A1 | 9/2005 | Thomas et al. | | 2008/0310717 A1 | 12/2008 | Saathoff et al. |
| 2005/0198095 A1 | 9/2005 | Du et al. | | 2009/0067726 A1* | 3/2009 | Erol et al. ............... 382/197 |
| 2005/0216257 A1 | 9/2005 | Tanabe et al. | | 2009/0152357 A1 | 6/2009 | Lei et al. |
| 2005/0234851 A1 | 10/2005 | King et al. | | 2009/0235187 A1 | 9/2009 | Kim et al. |
| 2005/0240381 A1 | 10/2005 | Seiler et al. | | 2010/0013615 A1 | 1/2010 | Hebert et al. |
| 2005/0261990 A1 | 11/2005 | Gocht et al. | | 2010/0174783 A1 | 7/2010 | Zarom |
| 2005/0273812 A1 | 12/2005 | Sakai | | 2011/0121069 A1 | 5/2011 | Lindahl et al. |
| 2005/0288859 A1 | 12/2005 | Golding et al. | | | | |
| 2005/0288911 A1 | 12/2005 | Porikli | | | | |

FOREIGN PATENT DOCUMENTS

| | | | |
|---|---|---|---|
| 2005/0289182 A1 | 12/2005 | Pandian et al. | |
| 2005/0289447 A1 | 12/2005 | Hadley et al. | |
| EP | 0706283 A | 4/1996 | |
| EP | 1229496 A2 | 8/2002 | |
| EP | 1555626 A2 | 7/2005 | |
| EP | 1662064 A1 | 5/2006 | |
| EP | 1783681 | 5/2007 | |
| JP | 10-228468 A | 8/1998 | |
| JP | 2000-165645 A | 6/2000 | |
| JP | 200268179 | 9/2000 | |
| JP | 2001211359 | 8/2001 | |
| JP | 2001230916 | 8/2001 | |
| JP | 2002513480 | 5/2002 | |
| JP | 2005286395 | 10/2005 | |
| JP | 2006053568 | 2/2006 | |
| JP | 2006059351 | 3/2006 | |
| JP | 2006215756 | 8/2006 | |
| WO | WO 99/05658 A1 | 2/1999 | |
| WO | WO 2004/072897 A2 | 8/2004 | |
| WO | WO 2005/043270 A2 | 5/2005 | |
| WO | WO 2007/073347 A1 | 6/2007 | |
| WO | 2008129373 | 10/2008 | |

OTHER PUBLICATIONS

U.S. Appl. No. 10/183,901, filed Mar. 30, 2004, Erol et al.

Aggarwal, M et al, "On Cosine-fourth and Vignetting Effects in Real Lenses," ICCV Proceedings, IEEE, 2001, vol. 1, pp. 472-479, [online] Retrieved from the Internet<URL:http://www.metaverselab.org/classis/635/reading/aggarwal-iccv.pdf>.

Akenine-Moller, T. et al., "Real-Time Rendering," A.K. Peters, Natick, MA, 2nd Edition, 2002, pp. 70-84.

Archive of "Barcodepedia.com—the online barcode database," [online] [Archived by http://archive.org on Jul. 9, 2006; Retrieved on Aug. 18, 2008] Retrieved from the Internet<http://web.archive.org/web/20060709101455/http://en. barcodepedia.com/>.

Baba, M. et al., "Shadow Removal from a Real Image Based on Shadow Density," Poster at SIGGRAPH2004, Updated Aug. 16, 2004, 4 pages, [online] Retrieved from the Internet<URL:http://www.cv.its.hiroshima-cu.ac.jp/baba/Shadow/poster04-02.pdf>.

Baird, H.S., "Document Image Defect Models and Their Uses," Proc., IAPR 2nd International Conference on Document Analysis and Recognition, Tsukuba Science City, Japan, Oct. 20-22, 1993, 7 pages.

Baird, H., "Document Image Defect Models," In Proc. of IAPR Workshop on Syntactic and Structural Pattern Recognition, Murray Hill, NJ, Jun. 1990, Structured Document Image Analysis, Springer-Verlag, pp. 546-556.

Baird, H., "The State of the Art of Document Image Degradation Modeling," In Proc. of the 4th IAPR International Workshop on Document Analysis Systems, Rio de Janeiro, Brazil, 2000, pp. 1-16, [online] Retrieved from the Internet<URL:http://www2.parc.xerox.com/istl/members/baird/das00.pas.gz>.

Barney Smith, E.H. et al., "Text Degradations and OCR Training," International Conference on Document Analysis and Recognition 2005, Seoul, Korea, Aug. 2005, 5 pages, [online] Retrieved from the Internet<URL:http://coen.boisestate.edu/EBarneySmith/Papers/ICDAR05_submit.pdf>.

Bouget, J., "Camera Calibration Toolbox for Matlab," Online Source, Updated Jul. 24, 2006, 6 pages, [online] Retrieved from the Internet<URL:http:www.vision.caltech.edu/bougetj/calib_doc/index.html#ref>.

Boukraa, M. et al., "Tag-Based Vision: Assisting 3D Scene Analysis with Radio-Frequency Tags," Jul. 8, 2002, Proceedings of the Fifth International Conference on Information Fusion, Piscataway, N.J., IEEE, Jul. 8-11, 2002, pp. 412-418.

Boyd, S., "EE263: Introduction to Linear Dynamical Systems," Online Lecture Notes, Stanford University, Spring Quarter, 2006-2007, Accessed on Sep. 11, 2006, 4 pages, [online] Retrieved from the Internet<URL:http://www.standford/edu/class/ee263/#lectures>.

Brassil, J. et al., "Hiding Information in Document Images," Proc. Conf. Information Sciences and Systems (CISS-95), Mar. 1995, Johns Hopkins University, Baltimore, MD, pp. 482-489.

"Call for Papers: ICAT 2007," 17th International Conference on Artificial Reality and Telexistence, 2007, [Online] [Retrieved on Nov. 4, 2008] Retrieved from the Internet<URL:http://www.idemployee.id.tue.nl/g.w.m.rauterberg/conferences/ICAT2007-CfP.pdf>.

Constantini, R. et al., "Virtual Sensor Design," Proceedings of the SPIE, vol. 5301, 2004, pp. 408-419, Retrieved from the Internet<URL:http://ivrgwww.epfl.ch/publications/cs04.pdf>.

Davis, M. et al., "Towards Context-Aware Face Recognition," Proceedings of the13th Annual ACM International Conference on Multimedia, Nov. 6-11, 2005, pp. 483-486, vol. 13.

Doermann, D. et al., "Progress in Camera-Based Document Image Analysis," Proceedings of the Seventh International Conference on Document Analysis and Recognition, ICDAR 2003, 11 pages, [online] Retrieved from the Internet<URL:http://www.cse.salford.ac.uk/prima/ICDAR2003/Papers/0111_keynote_III_doermann_d.pdf>.

Erol, B. et al., "Linking Multimedia Presentations with Their Symbolic Source Documents: Algorithm and Applications," Nov. 2-8, 2003, pp. 498-507, [Online] [Retreived on Oct. 15, 2008] Retrieved from the Internet<URL:http://rii.ricoh.com/{hull/pubs/p225_erol.pdf>.

Esposito, F. et al., "Machine Learning Methods for Automatically Processing Historical Documents: from Paper Acquisition to XML Transformation," Proceedings of the First International Workshop on Document Image Analysis for Libraries (DIAL '04), IEEE, 2004, pp. 1-8.

European Partial Search Report, European Application No. EP07015093.3, Dec. 17, 2007, 7 pages.

European Search Report, European Application No. 08160125.4, Oct. 13, 2008, 5 pages.

European Search Report, European Application No. 06796845.3, Oct. 30, 2008, 12 pages.

European Search Report, European Application No. 06796844.6, Oct. 30, 2008, 12 pages.

European Search Report, European Application No. 06796848.7, Oct. 31, 2008, 12 pages.

European Search Report, European Application No. 06796846.1, Nov. 5, 2008, 11 pages.

European Search Report, European Application No. 08159971.4, Nov. 14, 2008, 6 pages.

European Search Report, European Application No. 08160115.5, Nov. 12, 2008, 6 pages.

European Search Report, European Application No. 08160130.4, Nov. 12, 2008, 7 pages.

European Search Report, European Application No. 08160112.2, Nov. 10, 2008, 7 pages.

European Search Report, European Application No. 07252397, Oct. 15, 2007, 7 pages.

Ho, T.K. et al., "Decision Combination in Multiple Classifier Systems," IEEE Transactions on Pattern Analysis and Machine Intelligence, Jan. 1994, pp. 66-75, vol. 16, No. 1.

Ho, T.K. et al., "Evaluation of OCT Accuracy Using Synthetic Data," Proceedings of the 4th Annual Symposium on Document Analysis and Information Retrieval, Apr. 24-26, 1995, pp. 413-422. [online] Retrieved from the Internet<URL:http://citeseer.ist.psu.edu/cache/papers/cs/2303/http:zSzzSzcm.bell-labs.comzSzcmzSzcszSzwhozSzhsbzSzeoasd.pdf/ho95evaluation.pdf>.

Hull, J.J., "Document Image Matching and Retrieval with Multiple Distortion-Invariant Descriptors," International Association for Pattern Recognition Workshop on Document Analysis Systems, Jan. 1, 1995, pp. 375-396.

Hull, J.J. et al., "Document Image Matching Techniques," Apr. 30, 1997, pp. 31-35, [Online] [Retrieved on May 2, 1997] Retrieved from the Internet<URL:http://rii.ricoh.com/hull/pubs/hull_sdiut97.pdf>.

Hull, J. J., "Document Image Similarity and Equivalence Detection," International Journal on Document Analysis and Recognition, 1998, pp. 37-42, Springer-Verlag.

Hull, J., "Document Image Skew Detection: Survey and Annotated Bibliography," Document Analysis Systems II, World Scientific, 1998, pp. 40-64.

Hull, J.J. et al., "Paper-Based Augmented Reality," 17th International Conference on Artificial Reality and Telexistence, Nov. 1, 2007, pp. 205-209.

Kanungo, T. et al., "A Downhill Simplex Algorithm for Estimating Morphological Degradation Model Parameters," University of Maryland Technical Report, LAMP-RT-066, Feb. 2001, 15 pages, [online] Retrieved from the Internet<URL:http://lampsrv01.umiacs.umd.edu/pubs/TechReports/LAMP_066/LAMP_066.pdf>.

Kanungo, T. et al., "Global and Local Document Degradation Models," Document Analysis and Recognition, 1993, Proceedings of the Second International Conference on Volume, Oct. 20-22, 1993, pp. 730-734.

Khoubyari, S. et al., "Font and Funct on Word Ident ficat on n. Document Recogn t on," Computer Vision and Image Understanding, Jan. 1996, pp. 66-74, vol. 63, No. 1.

Khoubyari, S. et al., "Keyword Location and Noisy Document Images," Second Annual Symposium on Document Analysis and Information Retrieval, Las Vegas, NV, Apr. 26-28, 1993, pp. 217-231.

Kopec, G.E. et al., "Document Image Decoding Using Markov Source Models," IEEE Transactions on Pattern Analysis and Machine Intelligence, Jun. 1994, pp. 602-617, vol. 16, No. 6.

Li, Y. et al., "Validation of Image Defect Models for Optical Character Recognition," IEEE Trans. Pattern Anal. Mach. Intell. 18, 2, Feb. 1996, pp. 99-108, [online] Retrieved from the Internet<URL:http://www.cs.cmu.edu/afs/cs/usr/andrewt/papers/Validate/journal.ps.gz>.

Liang, J. et al., "Flattening Curved Documents in Images," In Proc. of the IEEE Conf. on Computer Vision and Pattern Recognition (CVPR), 2005, 8 pages, [online] Retrieved from the Internet<URL:http://www.cfar.umd.edu/~daniel/daniel_papersfordownload/liang-j_cpvr2005.pdf>.

Lu, Y. et al., "Document Retrieval from Compressed Images," Pattern Recognition, 2003, pp. 987-996, vol. 36.

McDonald, G., "Third Voice: Invisible Web Graffiti," PC World, May 18, 1999, [online] [Retrieved on Nov. 14, 2006] Retrieved from the Internet<URL:http://www.pcworld.com/news/article/0,aid,11016,00.asp>.

Microsoft Computer Dictionary (5th ed.), 2002, "Hyperlink" Definition, pp. 260-261.

"Mobile Search Engines," Sonera MediaLab, Nov. 15, 2002, pp. 1-12.

"Mobile Video Managed Service," Vidiator, 2008, [online] [Retrieved on Aug. 29, 2008] Retrieved from the Internet<URL:http://www.vidiator.com/services/managed_mobile_video.aspx>.

Mukherjea, S. et al., "AMORE: A World Wide Web Image Retrieval Engine," C&C Research Laboratories, NEC USA Inc., Baltzer Science Publishers BV, World Wide Web 2, 1999, pp. 115-132.

Pavlidis, T., "Effects of Distortions on the Recognition Rate of a Structural OCR System," In Pro. Conf. on Comp. Vision and Pattern Recog., IEEE, Washington, DC, 1983, pp. 303-309.

PCT International Search Report and Written Opinion, PCT/JP2006/316810, Oct. 10, 2006, 9 pages.

PCT International Search Report and Written Opinion, PCT/JP2006/316811, Oct. 10, 2006, 9 pages.

PCT International Search Report and Written Opinion, PCT/JP2006/316812, Oct. 10, 2006, 9 pages.

PCT International Search Report and Written Opinion, PCT/JP2006/316814, Oct. 10, 2006, 11 pages.

Sato, T. et al., "High Resolution Video Mosaicing for Documents and Photos by Estimating Camera Motion," Proceedings of the SPIE 5299, 246, 2004, 8 pages, [online] Retrieved from the Internet<URL:http://yokoya.naist.jp/paper/datas/711/spie2004.pdf>.

Schalkoff, R.J., "Syntactic Pattern Recognition (SYNTPR) Overview," Pattern Recognition: Statistical, Structural and Neural Approaces, Jan. 1, 1992, pp. 127-150, vol. 3, Wiley.

Sivic, J. et al., "Video Google: A Text Retrieval Approach to Object Matching in Videos," Proceedings of the Ninth IEEE International Conference on Computer Vision (ICCV 2003), 2-Volume Set, 2003, IEEE, pp. 1-8.=.

Stoyanov, D., "Camera Calibration Tools," Online Source, Updated Aug. 24, 2006, Accessed Aug. 31, 2006, 12 pages, [online] Retrieved from the Internet<URL:http://ubimon.doc.ic.ac.uk/dvs/index.php?m=581>.

Veltkamp, R. et al., "Content-Based Image Retrieval Systems: A Survey," Department of Computing Science, Utrecht University, Oct. 28, 2002, pp. 1-62.

Wikipedia Online Definition, "Optical Character Recognition," Sep. 14, 2008, pp. 1-7, [online] [Retrieved on Sep. 14, 2008] Retrieved from the Internet<URL:http://en.wikipedia.org/wiki/Optical_character_recognition>.

Wikipedia Online Encyclopedia,"Automatic Identification and Data Capture," Jul. 21, 2008, pp. 1-2, [Online] [Retrieved on Sep. 27, 2008] Retrieved from the Internet<URL:http://en.wikipedia.org/wiki/Automatic_identification_and_data_capture>.

Zhang, Z., "A Flexible New Technique for Camera Calibration," IEEE Transactions on Pattern Analysis and Machine Intelligence, Nov. 2000, pp. 1330-1334, vol. 22, No. 11.

Zheng, Q.-F. et al., "Effective and Efficient Object-Based Image Retrieval Using Visual Phases," Proceedings of the 14th Annual ACM International Conference on Multimedia, MM'06, Oct. 23-27, 2006, Santa Barbara, CA, pp. 77-80.

Zi, G., "Groundtruth Generation and Document Image Degradation," University of Maryland Language and Media Processing Laboratory Technical report (LAMP-TR-121), May 2005, 72 pages, [online] Retrieved from the Internet<URL:http://lampsrv01.umiacs.umd.edu/pubs/TechReports/LAMP_121/LAMP_121.pdf>=.

U.S. Office Action, U.S. Appl. No. 11/776,520, Dec. 7, 2010, 43 pages.

U.S. Office Action, U.S. Appl. No. 12/719,437, Dec. 9, 2010, 38 pages.

U.S. Office Action, U.S. Appl. No. 11/776,510, Dec. 10, 2010, 39 pages.

U.S. Office Action, U.S. Appl. No. 11/461,126, Dec. 23, 2010, 30 pages.

U.S. Office Action, U.S. Appl. No. 11/461,279, Jan. 7, 2011, 44 pages.

U.S. Office Action, U.S. Appl. No. 12/240,596, Jan. 21, 2011, 21 pages.

U.S. Office Action, U.S. Appl. No. 11/461,286, Jan. 21, 2011, 34 pages.

U.S. Office Action, U.S. Appl. No. 11/461,143, Feb. 4, 2011, 16 pages.

European Search Report, European Application No. 09170045.0, Nov. 24, 2009, 4 pages.

Roth, M.T. et al., "The Garlic Project," Proc. of the 1996 ACM SIGMOD International Conference on Management of Data, Montreal, Quebec, Canada, Jun. 4, 1996, pp. 557.

Archive of Scanbuy Solutions | Optical Intelligence for your Mobile Devices, Scanbuy® Inc., www.scanbuy.com/website/solutions_summary.htm, [Online] [Archived by http://archive.org on Jun. 19, 2006; Retrieved on Mar. 3, 2009] Retrieved from the Internet<URL: http://web.archive.org/web/20060619172549/http://www.scanbuy.com/website/solutions_su...>.

Canny, J., "A Computational Approach to Edge Detection," IEEE Transactions on Pattern Analysis and Machine Intelligence, Nov. 1986, pp. 679-714, vol. PAMI-8, No. 6.

Di Stefano, L. et al., "A Simple and Efficient Connected Components Labeling Algorithm," International Conference on Image Analysis and Processing, 1999, pp. 322-327.

Duda, R. O. et al., "Use of the Hough Transformation to Detect Lines and Curves in Pictures," Communications of the ACM, Jan. 1972, pp. 11-15, vol. 15, No. 1.

Erol, B. et al., "Prescient Paper: Multimedia Document Creation with Document Image Matching," 17th International Conference on Pattern Recognition, Aug. 23-26, 2004, Cambridge, UK.

Erol, B. et al., "Retrieval of Presentation Recordings with Digital Camera Images," IEEE Conference on Computer Vision and Pattern Recognition, Jun. 27-Jul. 2, 2004.

Ezaki, N. et al., "Text Detection from Natural Scene Images: Towards A System for Visually Impaired Persons," Proc. of 17th Int. Conf. on Pattern Recognition (ICPR 2004), IEEE Computer Society, Aug. 23-26, 2004, Cambridge, UK, pp. 683-686, vol. II.

Fadoua, D. et al., "Restoring Ink Bleed-Through Degraded Document Images Using a Recursive Unsupervised Classification Technique," Lecture Notes in Computer Science 3872, Document Analysis Systems VII, 7th International Workshop, DAS 2006, Feb. 13-15, 2006, Nelson, New Zealand, Bunke, H. et al. (eds.), pp. 38-49.

Freund, Y. et al., "A Short Introduction to Boosting," Journal of Japanese Society for Artificial Intelligence, Sep. 1999, pp. 771-780, vol. 14, No. 5.

Hjelmas, E. et al., "Face Detection: A Survey," Computer Vision and Image Understanding, 2001, pp. 236-274, vol. 83.

Hull, J.J., "Document Image Matching on CCITT Group 4 Compressed Images," SPIE Conference on Document Recognition IV, Feb. 8, 1997, pp. 82-87.

Jagannathan, L. et al., Perspective Correction Methods for Camera Based Document Analysis, Proc. First Int. Workshop on Camera-based Document Analysis and Recognition, 2005, pp. 148-154.

Jain, A.K. et al., "An Introduction to Biometric Recognition," IEEE Transactions on Circuits and Systems for Video Technology, Jan. 2004, pp. 4-20, vol. 14, No. 1.

Po, L-M. et al., "A Novel Four-Step Search Algorithm for Fast Block Motion Estimation," IEEE Transactions on Circuits and Systems for Video Technology, Jun. 1996, pp. 313-317, vol. 6, Issue 3.

Rangarajan, K. et al. "Optimal Corner Detector," 1988, IEEE, pp. 90-94.

Rosin, P.L. et al., "Image Difference Threshold Strategies and Shadow Detection," Proceedings of the 6th British Machine Vision Conference, 1995,10 pages.

Sezgin, M. et al., "Survey Over Image Thresholding Techniques and Quantitative Performance Evaluation," Journal of Electronic Imaging, Jan. 2004, pp. 146-165, vol. 13, No. 1.

Triantafyllidis, G.A. et al., "Detection of Blocking Artifacts of Compressed Still Images," Proceedings of the 11th International Conference on Image Analysis and Processing (ICIAP '01), IEEE, 2001, pp. 1-5.

U.S. Appl. No. 10/696,735, filed Oct. 28, 2003, Erol, B. et al., "Techniques for Using a Captured Image for the Retrieval of Recorded Information," 58 pages.

Zanibbi, R. et al. "A Survey of Table Recognition," International Journal on Document Analysis and Recognition, 2004, pp. 1-33.

Zhao, W. et al., Face Recognition: A Literature Survey, ACM Computing Surveys (CSUR), 2003, pp. 399-458, vol. 35, No. 4.

Japanese Office Action, Japanese Patent Application No. 200910138044.X, Jan. 26, 2011, 6 pages.

U.S. Notice of Allowance, U.S. Appl. No. 11/624,466, Feb. 22, 2011, 12 pages.

U.S. Notice of Allowance, U.S. Appl. No. 11/461,272, Feb. 23, 2011, 28 pages.

U.S. Office Action, U.S. Appl. No. 12/060,194, Feb. 25, 2011, 18 pages.

U.S. Office Action, U.S. Appl. No. 12/879,933, Mar. 2, 2011, 7 pages.

U.S. Office Action, U.S. Appl. No. 12/210,519, Mar. 14, 2011, 38 pages.

U.S. Notice of Allowance, U.S. Appl. No. 11/461,024, Mar. 16, 2011, 12 pages.

U.S. Office Action, U.S. Appl. No. 11/461,300, Mar. 18, 2011, 25 pages.

U.S. Office Action, U.S. Appl. No. 11/777,142, Mar. 18, 2011, 21 pages.

U.S. Office Action, U.S. Appl. No. 11/461,037, Mar. 30, 2011, 29 pages.

U.S. Office Action, U.S. Appl. No. 12/210,511, Apr. 4, 2011, 49 pages.

U.S. Office Action, U.S. Appl. No. 12/247,202, Apr. 6, 2011, 37 pages.

U.S. Office Action, U.S. Appl. No. 11/461,126, Apr. 12, 2011, 27 pages.

U.S. Office Action, U.S. Appl. No. 11/461,294, Apr. 12, 2011, 23 pages.

U.S. Office Action, U.S. Appl. No. 12/210,540, Apr. 15, 2011, 45 pages.

U.S. Office Action, U.S. Appl. No. 12/340,124, Apr. 15, 2011, 48 pages.

Liu, Y. et al., "Automatic Texture Segmentation for Texture-Based Image Retrieval," IEEE, Jan. 5-7, 2004, pp. 285-288.

Liu, T. et al., "A Fast Image Segmentation Algorithm for Interactive Video Hotspot Retrieval," IEEE, 2001, pp. 3-8.

Wikipedia Online Encyclopedia, "Image Scanner," Last Modified Feb. 9, 2010, pp. 1-9, [Online] [Retrieved on Feb. 13, 2010] Retrieved from the Internet<URL:http://en.wikipedia.org/wiki/Image_scanner>.

Wikipedia Online Encyclopedia, "Waypoint," Last Modified Feb. 13, 2010, pp. 1-4, [Online] Retrieved on Feb. 13, 2010] Retrieved from the Internet<URL:http://en.wikipedia.org/wiki/Waypoint>.

Erol, B. et al., "Linking Presentation Documents Using Image Analysis," IEEE, Nov. 9-12, 2003, pp. 97-101, vol. 1.

Hull, J.J. et al., "Visualizing Multimedia Content on Paper Documents: Components of Key Frame Selection for Video Paper," Proceedings of the Seventh International Conference on Document Analysis and Recognition (ICDAR'03), IEEE, 2003, 4 pages.

United States Office Action, U.S. Appl. No. 11/624,466, Jun. 8, 2010, 29 pages.

United States Office Action, U.S. Appl. No. 11/827,530, Jun. 9, 2010, 35 pages.

United States Office Action, U.S. Appl. No. 11/461,294, Jun. 11, 2010, 19 pages.

United States Office Action, U.S. Appl. No. 11/461,300, Jun. 11, 2010, 20 pages.

United States Office Action, U.S. Appl. No. 11/461,024, Jul. 14, 2010, 29 pages.

United States Office Action, U.S. Appl. No. 11/461,049, Jul. 28, 2010, 27 pages.

United States Office Action, U.S. Appl. No. 11/461,279, Aug. 5, 2010, 37 pages.

United States Office Action, U.S. Appl. No. 11/461,286, Aug. 5, 2010, 28 pages.

United States Office Action, U.S. Appl. No. 12/240,596, Aug. 6, 2010, 32 pages.

European Search Report, European Application No. 09156089.6, Jun. 19, 2009, 8 pages.

Marques, O. et al., "Content-Based Image and Video Retrieval, Video Content Representation, Indexing, and Retrieval, a Survey of Content-Based Image Retrieval Systems, CBVQ (Content-Based Visual Query)," Content-Based Image and Video Retrieval [Multimedia Systems and Applications Series], Apr. 1, 2002, pp. 15-117, vol. 21, Kluwer Academic Publishers Group, Boston, USA.

Japanese Office Action, Japanese Application No. 2004-293962, Aug. 24, 2010, 3 pages.

Extended European Search Report, Application No. 09178280.5-2201/2202646, Aug. 31, 2010, 6 pages.

United States Office Action, U.S. Appl. No. 11/461,143, Aug. 18, 2010, 9 pages.

United States Office Action, U.S. Appl. No. 11/461,272, Aug. 23, 2010, 31 pages.

United States Office Action, U.S. Appl. No. 11/461,126, Sep. 3, 2010, 28 pages.

United States Notice of Allowance, U.S. Appl. No. 11/461,095, Sep. 27, 2010, 29 pages.

United States Office Action, U.S. Appl. No. 12/060,194, Oct. 1, 2010, 29 pages.

United States Office Action, U.S. Appl. No. 11/461,294, Oct. 7, 2010, 17 pages.

United States Office Action, U.S. Appl. No. 11/461,300, Oct. 6, 2010, 20 pages.

United States Office Action, U.S. Appl. No. 11/827,530, Oct. 7, 2010, 21 pages.

United States Office Action, U.S. Appl. No. 11/624,466, Oct. 14, 2010, 11 pages.

United States Notice of Allowance, U.S. Appl. No. 11/461,091, Oct. 18, 2010, 31 pages.

United States Notice of Allowance, U.S. Appl. No. 11/461,024, Nov. 15, 2010, 10 pages.

United States Notice of Allowance, U.S. Appl. No. 11/461,049, Nov. 16, 2010, 10 pages.

United States Notice of Allowability, U.S. Appl. No. 11/461,091, Nov. 17, 2010, 22 pages.

United States Office Action, U.S. Appl. No. 11/777,142, Nov. 10, 2010, 17 pages.

Antonacopoulos et al., "Flexible Page Segmentation Using the Background", Proceedings of the IAPR International Conference on Pattern Recognition, Jerusalem, Oct. 9-13, 1994. Conference B: Pattern Recognition and Neural Networks; [Proceedings of the IAPR International Conference on Pattern Recognition], Los Alamitos, IEE, vol. 2, Oct. 9, 1994, pp. 339-344, XP000509905, ISBN: 978-0-8186-6272-0.

Reniers et al., "Skeleton-based Hierarchical Shape Segmentation", IEEE International Conference on Shape Modeling and Applications. SMI'07, Jun. 1, 2007, Computer Society, pp. 179-188, XP031116745, ISBN: 978-0-7695-2815-1.

Rademacher, "View-Dependent Geometry", Computer Graphics Proceedings, Annual Conference Series, SIGGRAPH 99, Los Angeles, California Aug. 8-13, 1999, pp. 439-446, XP001024743.

U.S. Patent Office Action, U.S. Appl. No. 12/121,275, Apr. 20, 2011, 44 pages.

U.S. Patent Office Action, U.S. Appl. No. 11/776,520, Apr. 28, 2011, 10 pages.

Extended European Search Report, European Patent Application No. 082523770, May 2, 2011, 6 pages.

U.S. Patent Office Action, U.S. Appl. No. 11/776,510, May 12, 2011, 20 pages.

U.S. Patent Office Action, U.S. Appl. No. 12/210,519, Jun. 16, 2011, 22 pages.

U.S. Patent Office Action, U.S. Appl. No. 12/060,194, Jun. 27, 2011, 18 pages.

United States Office Action, U.S. Appl. No. 11/461,279, Jul. 8, 2011, 46 pages.

United States Office Action, U.S. Appl. No. 11/461,286, Jul. 15, 2011, 37 pages.
United States Office Action, U.S. Appl. No. 11/461,126, Jul. 22, 2011, 35 pages.
United States Notice of Allowance, U.S. Appl. No. 12/247,202, Jul. 28, 2011, 16 pages.
United States Office Action, U.S. Appl. No. 11/461,143, Aug. 11, 2011, 20 pages.
United States Office Action, U.S. Appl. No. 12/253,715, Aug. 31, 2011, 58 pages.
United States Office Action, U.S. Appl. No. 12/060,198, Sep. 1, 2011, 87 pages.
United States Office Action, U.S. Appl. No. 12/060,200, Sep. 2, 2011, 65 pages.
United States Notice of Allowance, U.S. Appl. No. 11/776,510, Sep. 22, 2011, 11 pages.
United States Office Action, U.S. Appl. No. 11/777,142, Sep. 23, 2011, 22 pages.
United States Office Action, U.S. Appl. No. 12/210,511, Sep. 28, 2011, 25 pages.
United States Office Action, U.S. Appl. No. 12/247,205, Oct. 6, 2011, 56 pages.
United States Office Action, U.S. Appl. No. 12/342,330, Oct. 7, 2011, 47 pages.
Mae et al., "Object Recognition Using Appearance Models Accumulated into Environment", Proc. 15-th Intl. Conf. on Pattern Recognition, 2000, vol. 4, pp. 845-848.
EPO Summons for Oral Proceedings, European Patent Application No. 07015093.3, Sep. 16, 2011, 4 pages.
Japanese Office Action, Japanese Patent Application No. 2008-008112, Oct. 25, 2011, 3 pages.
Adobe Acrobat Advanced Elements (for both PC and Mac Computers), 2002, pp. 1-19.
U.S. Office Action, U.S. Appl. No. 12/210,540, Oct. 14, 2011, 22 pages.
U.S. Office Action, U.S. Appl. No. 12/265,502, Oct. 14, 2011, 61 pages.
U.S. Office Action, U.S. Appl. No. 11/776,520, Oct. 17, 2011, 19 pages.
U.S. Office Action, U.S. Appl. No. 12/121,275, Oct. 19, 2011, 24 pages.
U.S. Office Action, U.S. Appl. No. 12/340,124, Oct. 24, 2011, 31 pages.
U.S. Office Action, U.S. Appl. No. 11/827,530, Oct. 28, 2011, 43 pages.
U.S. Office Action, U.S. Appl. No. 12/879,933, Oct. 28, 2011, 36 pages.
U.S. Office Action, U.S. Appl. No. 12/210,532, Oct. 31, 2011, 61 pages.
U.S. Office Action, U.S. Appl. No. 11/461,037, Nov. 23, 2011, 33 pages.
U.S. Notice of Allowance, U.S. Appl. No. 12/060,194, Nov. 28, 2011, 23 pages.
U.S. Office Action, U.S. Appl. No. 11/461,126, Dec. 1, 2011, 53 pages.
U.S. Notice of Allowance, U.S. Appl. No. 11/461,143, Dec. 5, 2011, 15 pages.
United States Office Action, U.S. Appl. No. 12/060,206, Dec. 15, 2011, 55 pages.
United States Office Action, U.S. Appl. No. 12/210,519, Jan. 5, 2012, 29 pages.
United States Notice of Allowance, U.S. Appl. No. 11/776,520, Jan. 5, 2012, 28 pages.
United States Office Action, U.S. Appl. No. 11/461,294, Jan. 18, 2012, 38 pages.
United States Office Action, U.S. Appl. No. 11/461,286, Jan. 20, 2012, 27 pages.
United States Notice of Allowance, U.S. Appl. No. 11/777,142, Jan. 20, 2012, 29 pages.
United States Notice of Allowance, U.S. Appl. No. 12/342,330, Jan. 23, 2012, 21 pages.
United States Office Action, U.S. Appl. No. 12/059,583, Jan. 26, 2012, 78 pages.
United States Notice of Allowance, U.S. Appl. No. 12/253,815, Jan. 26, 2012, 62 pages.
United States Office Action, U.S. Appl. No. 12/240,596, Feb. 2, 2012, 44 pages.
United States Office Action, U.S. Appl. No. 11/461,300, Feb. 23, 2012, 38 pages.

* cited by examiner

RECOGNITION AND TRACKING USING INVISIBLE JUNCTIONS

BACKGROUND OF THE INVENTION

The present invention relates to processing techniques for patch recognition. More particularly, the present invention relates to systems and methods for using a new feature referred to herein as invisible junctions for image-based document patch recognition. Still more particularly, the present invention relates to a system and method for performing recognition and tracking using invisible junctions.

Computers and electronic documents were once restricted to use in a desktop environments where electronic documents were output by the computer to printers and printed on paper. Printers and copiers are used in private and commercial office environments, in home environments with personal computers, and in document printing and publishing service environments. Once an electronic document is printed out on paper, manipulations on these two types of documents are mostly independent. Printing and copying technology has not been able to bridge the gap between static printed media (i.e., paper documents), and the "virtual world" of interactivity that includes the likes of digital communication, networking, information provision, advertising, entertainment and electronic commerce.

The advent and ever-increasing popularity of smaller portable computing devices and personal electronic devices, such as personal digital assistant (PDA) devices, cellular telephones (e.g., cellular camera phones) and digital cameras over the past few years, has expanded the concept of documents to include their electronic version by making the available in an electronically readable and searchable form and by introducing interactive multimedia capabilities, which are unparalleled by traditional printed media.

There continue to be problems in the prior art in bridging between the world of electronic documents on one hand and the world of paper documents on the other. A gap exists between the virtual multimedia-based world that is accessible electronically and the physical world of print media. In particular, it is still very difficult and/or computationally expensive to use a printed document to access or even find the electronic document from which the paper document was generated. A key obstacle to identifying and finding an electronic document corresponding to a printed document is the recognition of an image patch that is being captured by the camera. While capturing an image of the printed document has become trivial with the proliferation of cell phones with cameras, there is no way to use such low quality images for electronic document retrieval.

In other words, there is not an existing method that can effectively identify from a database the document page the camera is looking at, pin-point the exact camera look-at point on the recognized page, and estimate the frame box of the image on the recognized document page. This recognition task is made even more challenging considering that: 1) the input image is a small portion of the document page being looked at; 2) there is a large number of document pages in the database that look similar to each other; 3) the hand-held camera could have very different viewing conditions including different viewing angles and distances with respect to paper and camera motion due to hand movement; 4) there are considerable photometric changes due to lighting changes; and 5) there may be non-planar geometric deformation if the user is holding the paper by hand.

While there have been attempts in the prior art, they suffer from a number of deficiencies. For example, a popular Scale-Invariant Feature Transform (or SIFT) is not suitable for text documents. The SIFT key points are chosen from the extrema in scale space. More specifically, all scales and image locations are scanned for local maxima in scale space; these local maxima are chosen as key point candidates. This makes the SIFT poor at discrimination between text and the SIFT is not stable and repeatable in noisy environments. Other prior art approaches focus on geometric features of the text block but they are not suitable for Asian or ideographic languages.

Yet another problem with the prior art is that the few types of recognition available have discrimination capabilities that work poorly on text and image text combinations. This is in part due to the fact that there is some regularity in geometric layout of all text documents. Often the prior art recognition methods return large number of candidate matches with no ranking or ranking that provides to many false positive matches.

One additional problem with the prior art is that there is not a method for indicating the region of an electronic document that corresponds to a query image being input. In particular, there are no prior art methods for indicating the viewing region and a camera look at point on the electronic document.

SUMMARY OF THE INVENTION

The present invention overcomes the deficiencies of the prior art with a system for using invisible junctions for image-based document patch recognition. The system is advantageous because it uses invisible junctions of a low quality image patch to identify and retrieve a corresponding electronic document, page, look-at point and viewing region. The system is advantageous because it is very fast, works with both western and eastern languages, and works images that mix text and image components. The present invention uses invisible junctions which are a set of local features unique to every page of the electronic document to match the captured image to a part of an electronic document. In one embodiment, the system of the present invention includes: an image capture device, a feature extraction and recognition system and database. The feature extraction and recognition system further comprises a feature extraction unit, a feature indexing unit, a feature retrieval unit and a geometric estimation unit. When an electronic document is printed, the feature extraction and recognition system, for example in print-capture software, captures an image of the document page. The features in the captured image are then extracted, indexed and stored in the database. Given a query image, usually a small patch of some document page captured by a low resolution image capture device such as a web-cam, the features in the query image are extracted and compared against those stored in the database to identify the query image. The feature extraction and recognition system advantageously uses geometric estimation to reduce the query result to a single one or a few candidate matches. In one embodiment, the feature extraction and recognition system uses two separate geometric estimations to rank and verify matching candidates. The present invention also includes methods for feature extraction, feature indexing, feature retrieval and geometric estimation.

The present invention also includes methods for recognizing and tracking the viewing region and look at point corresponding to the input query image. Moreover, the present invention is particularly advantageous because this information is combined with a rendering of the original input document to generate a new graphical user interface for the user. This user interface can be displayed on a conventional browser or even on the display of an image capture device.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIG. 10D show an initial window with a START Button. FIG. 10E shows a window with an image of Asian text captured by a cameral phone. FIG. 10F show a window, a reference to a file and a STOP Button. FIG. 10G shows a window displaying a web page with the user interface mechanism showing the are captured by the camera phone and movement. FIG. 10H shows a window displaying a blurred image captured by a camera phone and the corresponding retrieved webpage results in FIG. 10I. FIG. 10J shows a window displaying a blurred image captured by a camera phone and the corresponding retrieved webpage result in FIG. 10K.

DETAILED DESCRIPTION OF PREFERRED EMBODIMENTS

Figure 1:
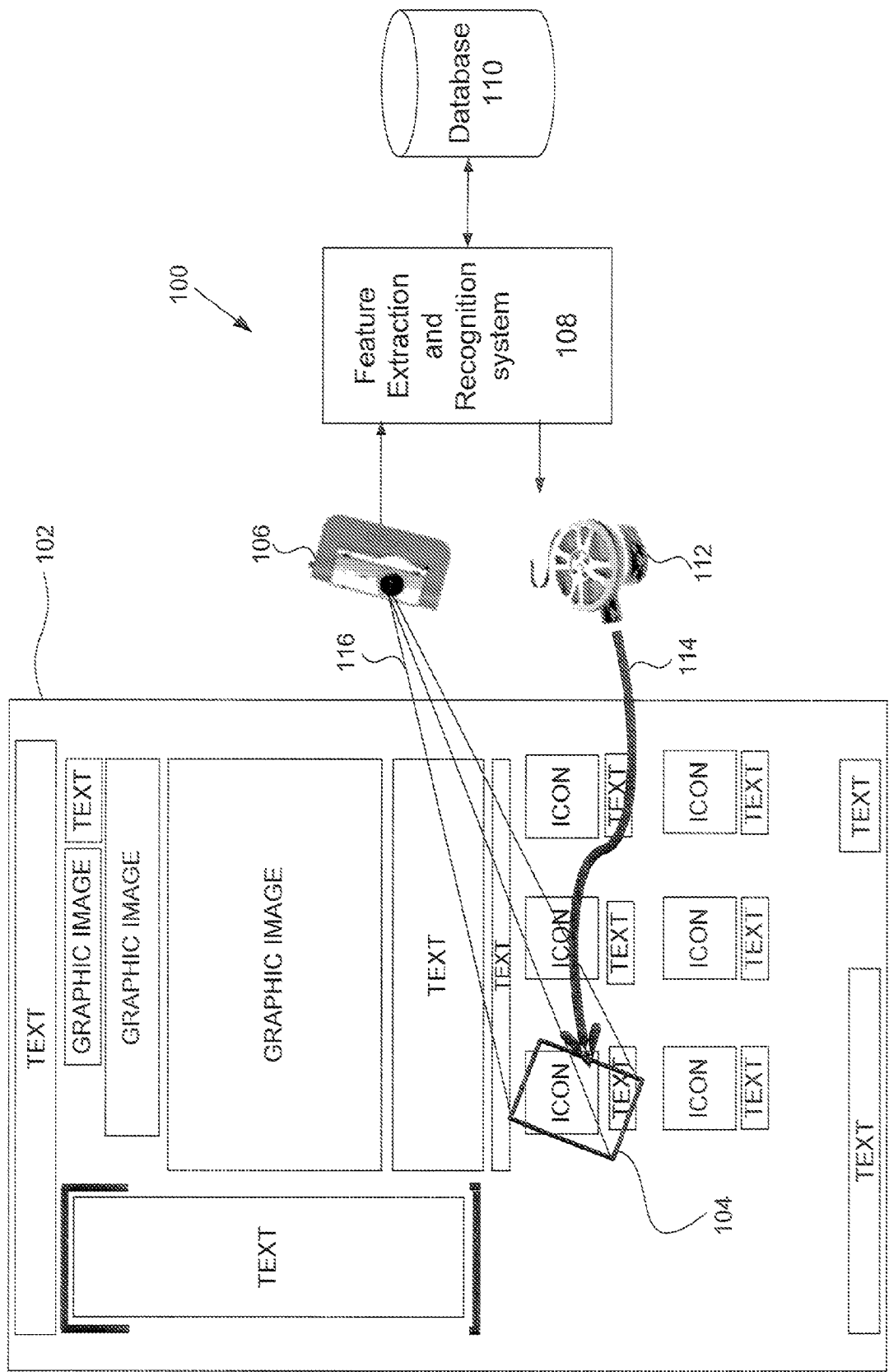
FIG. 1 is a functional diagram of an embodiment of a system for feature extraction and recognition in accordance with present invention.

A system for using a new feature referred to herein as invisible junctions for image-based document patch recognition is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

Referring now to FIG. 1, an embodiment of a system 100 of the present invention for using a new feature, referred to herein as an invisible junction, for image-based document patch recognition is shown. The present invention uses invisible junctions, which are a set of local features as described below with reference to FIG. 5A-5D, to match the captured image to a portion of an electronic document. In this embodiment, the system 100 comprises: an image capture device 106, a feature extraction and recognition system 108 and a database 110 configured to capture an image of a portion 104 of a printed or paper document 102 and retrieve the corresponding electronic document, page, look-at point and viewing region. The correspondence between the original area 104 of the paper document 102 and the electronic representation 112 is shown by line 114. FIG. 1 illustrates an example of the system 100 capturing 116 a query image such as a small patch 104 of some paper document 102 with the image capture device 106. The feature extraction and recognition system 108 extracts the features in the query image and compares them against those stored in the database 110 to identify the electronic representation 112.

The image capture device 106 is any conventional type known in the art. For example, in the query portion of the process, the image capture device 106 may be a web camera, a camera that is part of cell phone or a digital camera. The present invention is particularly advantageous because it is operable with low resolution image capture devices. The image capture device 106 is coupled for communication with the feature extraction and recognition system 108. This communication may be via a wired or wireless network.

In another embodiment where model images are being indexed, the image captured device 106 is a scanner of a multifunction peripheral or software for generating a printed document. For example, the image captured device 106 could be print capture software in such an embodiment. These embodiments are used to index documents being output or printed by a computer (not shown).

The feature extraction and recognition system 108 performs the functions of feature extraction, indexing and retrieval for invisible junctions. The feature extraction and recognition system 108 further comprises a feature extraction unit 310, a feature indexing unit 312, a feature retrieval unit 314 and a geometric estimation unit 316 as will be described in more detail below with reference to FIGS. 2-4. The feature extraction and recognition system 108 is coupled to the image capture device 106 to receive an image of a paper document, a model image of the paper document or an image patch. The feature extraction and recognition system 108 is coupled to the database 110 to store feature descriptions of document pages and electronic document or indices to electronic documents. The feature extraction and recognition system 108 is also coupled to the database 110 to retrieve electronic document or indices to electronic documents during retrieval. The feature extraction and recognition system 108 is also coupled to output the retrieved electronic document, page, look-at point and viewing region to other computing systems for display with user interfaces.

The database 110 is a conventional type and stores indices, electronic documents, feature descriptions and other information used in the indexing and retrieval process. The database may be a federation of databases. In one embodiment, the database 110 is stored within a multifunction peripheral device.

The system 100 of the present invention is particularly advantageous because it provides a number of benefits. First, it uses a new feature, referred to herein as an invisible junction, that enable the identification and retrieval of a corresponding electronic document, page, look-at point and viewing region. The invisible junction provides stability or independence from noise and viewing condition; is repeatable in both the query image and the model image; provides strong discrimination, and is low dimensional. Second, the present invention provides a very fast recognition and retrieval at a rate of nearly 4 frames per second on a database of 10000 pages. The recognition and retrieval is fast enough for real-time interactive applications. Third, the present invention can use noisy low quality input image such as available with a cell phone camera for recognition and retrieval. In other words, the retrieval operates accurately despite image rotation, scale changes and occlusions. Fourth, the present invention can perform recognition and retrieval on both eastern and western languages. Fifth, the present invention can perform recognition and retrieval on input images that include both text and graphic images in any portion for text to image.

System Embodiments

Figure 2:
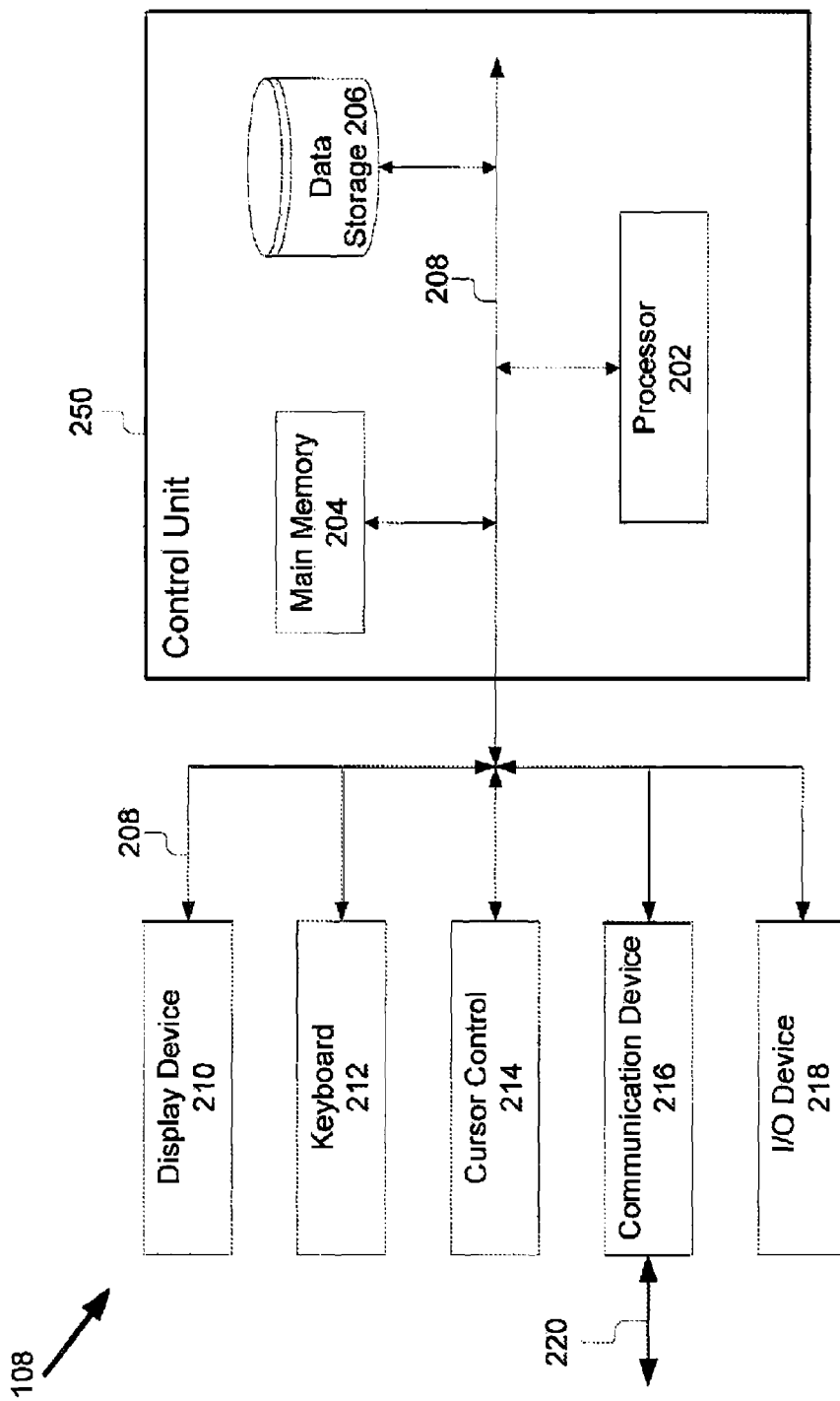
FIG. 2 illustrates a block diagram of an embodiment of a system configured in accordance with an embodiment of the present invention.

Referring now also to FIG. 2, a functional block diagram of the feature extraction and recognition system 108 configured in accordance with an embodiment of the present invention is shown. The feature extraction and recognition system 108 preferably comprises a control unit 250, a display device 210, an input device 212, cursor control 214, a communication device 216, and one or more input/output (I/O) devices 218.

The control unit 250 comprises an arithmetic logic unit, a microprocessor, a general purpose computer or some other information appliance equipped to provide electronic display signals to display device 210. In one embodiment, the control unit 250 comprises a general purpose computer having a graphical user interface, which may be generated by, for example, a program written in Java running on top of an operating system like WINDOWS® or UNIX® based operating systems. In one embodiment, one or more application programs are executed by control unit 250 including, without limitation, drawing applications, word processing applications, electronic mail applications, financial applications and web browser applications.

Still referring to FIG. 2, the control unit 250 is shown including processor 202, main memory 204 and data storage device 206, all of which are communicatively coupled to system bus 208.

Processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included.

Main memory 204 stores instructions and/or data that may be executed by processor 202. The instructions and/or data may comprise code for performing any and/or all of the techniques described herein. Main memory 204 may be a dynamic random access memory (DRAM) device, a static random access memory (SRAM) device, or some other memory device known in the art. The memory 204 is described in more detail below with reference to FIG. 3.

Data storage device 206 stores data and instructions for processor 202 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, data storage device 206 includes database 110. In an alternate embodiment, the database is coupled to the feature extraction and recognition system 108 via communication device 216 and signal line 220 representing a conventional network.

System bus 208 represents a shared bus for communicating information and data throughout control unit 250. System bus 208 may represent one or more buses including an industry standard architecture (ISA) bus, a peripheral component interconnect (PCI) bus, a universal serial bus (USB), or some other bus known in the art to provide similar functionality. Additional components coupled to control unit 250 through system bus 208 include the display device 210, the input device 212, cursor control 214, the communication device 216 and the I/O device(s) 218.

Display device 210 represents any device equipped to display electronic images and data as described herein. In one embodiment, the display device 210 is a liquid crystal display (LCD) and light emitting diodes (LEDs) to provide status feedback, operation settings and other information to the user. In other embodiments, the display device 210 may be, for example, a cathode ray tube (CRT) or any other similarly equipped display device, screen or monitor. In one embodiment, display device 210 is equipped with a touch screen and/or includes a digitizer in which a touch-sensitive, transparent panel covers the screen of display device 210.

In one embodiment, the input device 212 is a keyboard. The keyboard can be a QWERTY keyboard, a key pad, or representations of such created on a touch screen. Cursor control 214 represents a user input device equipped to communicate positional data as well as command selections to processor 202. Cursor control 214 may include a mouse, a trackball, a stylus, a pen, a touch screen, cursor direction keys or other mechanisms to cause movement of a cursor.

Communication device 216 links control unit 250 to a network 220 that may include multiple processing systems and in one embodiment is a network controller. The network of processing systems may comprise a local area network (LAN), a wide area network (WAN) (e.g., the Internet), and/or any other interconnected data path across which multiple devices may communicate. The control unit 250 also has other conventional connections to other systems such as a network for distribution of files (media objects) using standard network protocols such as TCP/IP, http, https, and SMTP as will be understood to those skilled in the art.

One or more I/O devices 218 are coupled to the bus 208. These I/O devices may be part of the other systems (not shown). For example, the I/O device 218 can include an image scanner for capturing an image of a document. The I/O device 218 may also includes a printer for generating documents. The I/O device 218 may also include audio input/output device equipped to receive audio input via a microphone and transmit audio output via speakers. In one embodiment, audio device is a general purpose; audio add-in/expansion card designed for use within a general purpose computer system. Optionally, I/O audio device may contain one or more analog-to-digital or digital-to-analog converters, and/or one or more digital signal processors to facilitate audio processing.

It should be apparent to one skilled in the art that feature extraction and recognition system 108 may include more or less components than those shown in FIG. 2 without departing from the spirit and scope of the present invention. For example, feature extraction and recognition system 108 may include additional memory, such as, for example, a first or second level cache, or one or more application specific integrated circuits (ASICs). Further, the feature extraction and recognition system 108 may include multiple data buses rather than the single bus 208. Multiple buses allow fast transfer of image data from and between the components of the feature extraction and recognition system 108, and simultaneous data transfer of user interface information to a display device, for example. Similarly, additional input/output devices 218 may be coupled to control unit 250 including, for example, an RFID tag reader, digital still or video cameras, or other devices that may or may not be equipped to capture and/or download electronic data to control unit 250. One or more components could also be eliminated such as the keyboard & cursor control 212.

Figure 3:
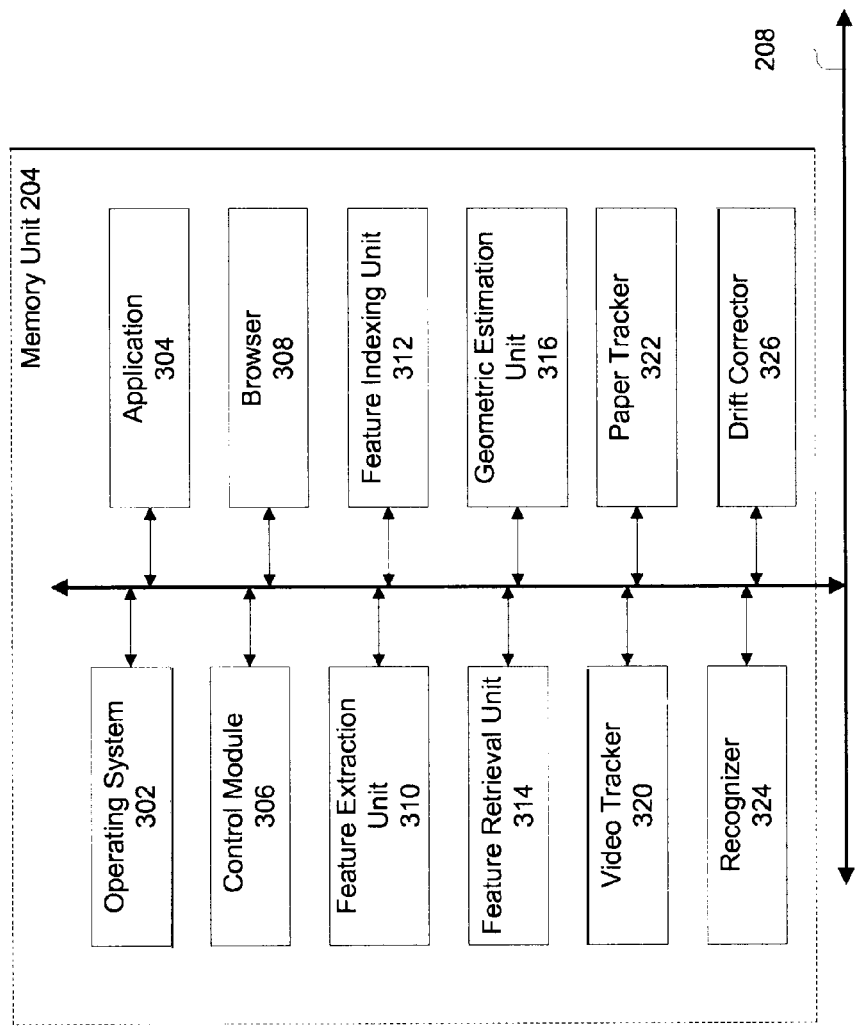
FIG. 3 illustrates a block diagram of a memory of the system of FIG. 2 configured in accordance with an embodiment of the present invention.

FIG. 3 is a block diagram of one embodiment of the memory unit 204 for the feature extraction and recognition system 108. The memory unit 204 preferably comprises: an operating system 302, an application 304, a control module 306, a browser 308, a feature extraction unit 310, a feature indexing unit 312, a feature retrieval unit 314, a geometric estimation unit 316, a video tracker 320, a paper tracker 322, a recognizer 324 and a drift corrector 326. Those skilled in the art will recognize that the memory 204 also includes buffers for storing data and other information temporarily during the indexing or retrieval process. As noted above, the memory unit 204 stores instructions and/or data that may be executed by processor 202. The instructions and/or data comprise code for performing any and/or all of the techniques described herein. These modules 302-314 are coupled by bus 208 to the processor 202 for communication and cooperation to system 100. Those skilled in the art will recognized that while the present invention will now be described as modules or portions of a memory unit 204 of a computer, the modules or portions thereof may also be stored in other media such as permanent data storage device 206 and may be distributed across a network 220 having a plurality of different computers such as in a client/server environment.

The operating system 302 is preferably a custom operating system that is accessible to user via an application interface. In an alternate embodiment, the operating system 302 is one of a conventional type such as, WINDOWS®, SOLARIS® or LINUX® based operating systems.

The memory unit 204 also includes one or more application programs 304 including, without limitation, drawing applications, word processing applications, electronic mail applications, financial applications and web browser applications. In one embodiment, the applications 304 specifically utilize the unique capabilities of the other modules or units of memory 204 to bridge the gap between electronic documents and paper documents by enabling users to establish and identify links between a printed paper and its corresponding electronic document. More specifically, the applications 304 access electronic data from a paper and attach/embed electronic data to specific locations on a paper so that a user can later retrieval that electronic data from the paper, using cameras as the tool for the above operations. For example, one application 304 retrieves an electronic file (Microsoft Word, Adobe PDF, etc) of a printed paper in response to the user simply pointing a web-cam and capturing an image of the printed paper. Another example application 304 is a paper-based photo-wiki, which lets the user attach the pictures you have taken to specific locations on a paper map (and its electronic version), by simply pointing the camera to the desired locations on the physical paper map. There are many other applications 304 such as novel user interfaces to access or browse a document database, digitized pen and paper, map navigator, security in copiers and scanners, camera games and duplicate detection for copyright protection.

The control module 306 is used to control the other modules of the memory 204. The control module 306 is adapted for control of and communication with the application 304, the browser 308, the feature extraction unit 310, the feature indexing unit 312, the feature retrieval unit 314 and the geometric estimation unit 316. The operation of the control module 306 will be apparent from the description of FIGS. 4 and 6-9 below. While the control module 306 is shown as a separate module of the memory 204, those skilled in the art will recognize that the control module 306 in another embodiment may be distributed as routines in the other modules 310-316.

The browser 308 is a conventional type such as Internet Explorer by Microsoft® or Firefox by Mozilla. The Web browser is a software application that enables a user to display and interact with text, images, and other information typically located on a Web page at a website on the World Wide Web or a local area network.

The feature extraction unit 310 is software and routines for extracting the invisible junction features from original electronic documents and scanned images of paper documents. In one embodiment, the feature extraction unit 310 includes an input coupled to receive original electronic documents and an output to provide a feature description to the feature indexing unit 312. In another embodiment, the feature extraction unit 310 includes an input coupled to receive an image of a paper document and provide a feature description to the feature retrieval unit 314. In yet another embodiment, the feature extraction unit 310 includes a location determination module, a size determination module, an orientation determination module and a descriptor creator module coupled in series to produce the feature description. The operation of the feature extraction unit 310 is described below in detail with reference to FIGS. 5A-6. The feature extraction unit 310 is coupled for communication with the feature indexing unit 312 and the feature retrieval unit 314.

The feature indexing unit 312 is software and routines for generating one or more indices of invisible junction feature descriptions and storing them in the database 110. In one embodiment, the feature indexing unit 312 uses a quantization tree to index the feature descriptions. The feature indexing unit 312 is coupled to an output of the feature extraction unit 310 to receive invisible junction feature descriptions. The feature indexing unit 312 is coupled to the database 110. The operation of the feature indexing unit 312 is described in detail below with reference to FIGS. 7A and 7B.

The feature retrieval unit 314 is software and routines for creating a query from the invisible junction feature descriptions of a paper document and communicating with the database 110 to retrieve a document, a point and a viewing region of a matching electronic document from the database 110. The feature retrieval unit 314 is coupled to an output of the feature extraction unit 310 to receive invisible junction feature descriptions, and to the database 110 to perform queries and receive results. The possible matching documents, points and viewing regions are output by the feature retrieval unit 314. The operation of the feature retrieval unit 314 is described in detail below with reference to FIG. 8.

The geometric estimation unit 316 is software and routines for sorting the candidate documents output by the feature retrieval unit 314 and selecting a document that includes the largest number of feature points consistent with the geometric constraint. The geometric estimation unit 316 is adapted for communication with the feature retrieval unit 314 and has an output that provides a document, a point and a viewing region that matches the input image patch. The operation of the geometric estimation unit 316 is described in detail below with reference to FIG. 9A.

The present invention also includes the capability to recognize and track the look at position and viewing region base on an input query image. In addition to generating information indicating the document, look at position and the viewing region, the present invention merges that information with the original electronic document to generate novel user interfaces that provide the user with precise information to link very specific locations within the electronic document for actions such as adding annotations or controlling operations. This recognition and tracking capability is provides by the video tracker 320, the paper tracker 322, the recognizer 324 and the drift corrector 326. The control module 306 also controls the operation of the video tracker 320, the paper tracker 322, the recognizer 324 and the drift corrector 326 consistent with the state diagram of FIG. 10C. Those skilled in the art will recognize that in an alternate embodiment, another module such as a recognition and tracking module (not shown) could be use in place of the control module 306. This functionality is described in more detail below with reference to FIGS. 10A and 10C.

The video tracker 320 is software and routines for tracking camera motion as a projective transformation across video frames. The video tracker 320 uses the first video frame as the reference frame, and then outputs information indicating movement the camera. In essence, the video tracker 320 provides the relative motion of the camera between frames. The video tracker 320 is adapted for communication with the feature retrieval unit 314 to receive feature descriptors and has an output to provide generated camera motion information. The operation of the video tracker 320 is described in detail below with reference to FIGS. 10A and 10C.

The paper tracker 322 is software and routines for tracking camera motion with respect to the position of the paper. The paper tracker 322 uses the paper plane as a reference frame, and then outputs information indicating the camera position relative to the paper plane. This information can then be used to translate the information from the video tracker 322 (relative or local coordinate space) to move with reference to the paper (a global coordinate space). The paper tracker 322 is adapted for communication with the feature retrieval unit 314 to receive feature descriptors and has an output to provide paper position information. The operation of the paper tracker 322 is described in detail below with reference to FIGS. 10A and 10C.

The recognizer 324 is software and routines for recognize the document page, location and viewing area, the current video frame, and for initializing the link between paper and the video frame. The recognizer 324 is adapted for communication with the feature retrieval unit 314, the video tracker and the paper tracker 322. The recognizer 324 provides the current video frame and links between paper and the video frame to the paper tracker 322. The operation of the recognizer 324 is described in detail below with reference to FIGS. 10A and 10C.

The drift corrector 326 is software and routines for correcting the link between paper and the video frame. The drift corrector 326 is adapted for communication with the paper tracker 322 and sends signal to make sure the document page, location and viewing area are properly aligned with the paper. The drift corrector 326 provides this information the paper tracker 322. The operation of the paper tracker 322 is described in detail below with reference to FIGS. 10A and 10C.

Figure 4:
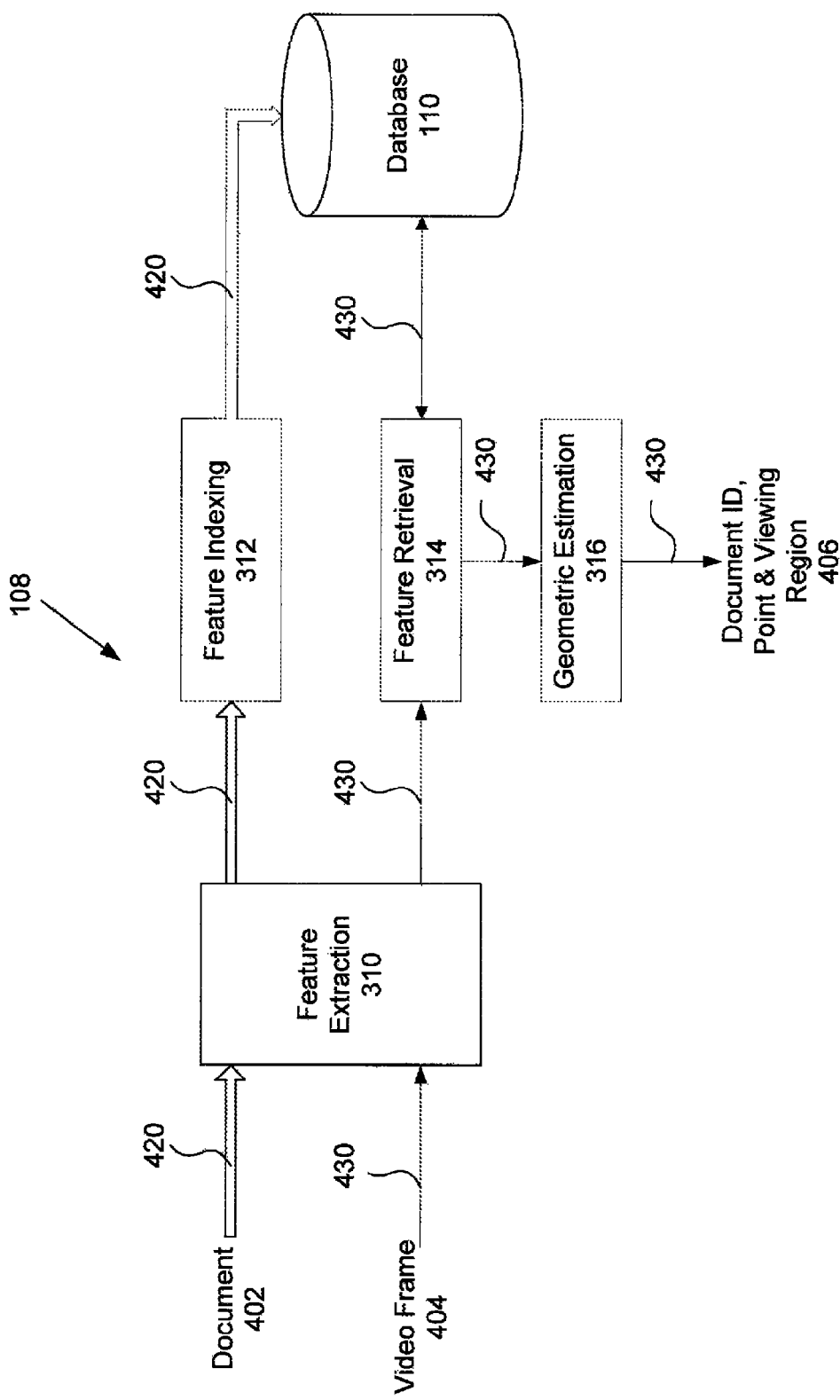
FIG. 4 is a block diagram of an embodiment of a Feature Extraction and Recognition system of FIG. 1 in accordance with the present invention.

Referring now to FIG. 4, functional flow diagram of an embodiment of a feature extraction and recognition system 108 in accordance with the present invention is shown. The feature extraction and recognition system 108 includes two operational modes: a first mode in which the original electronic document is rendered and input and a feature index is stored for the invisible junction features from the input; and a second mode in which a image patch is input, and a feature description is created and used to retrieve a corresponding document, point and viewing region are output. For convenience and ease of understanding like reference numerals are used for like components having the same or similar functionality as that described above for other embodiments. This second embodiment of the system 108 includes the feature extraction unit 310, the feature indexing unit 312, the feature retrieval unit 314 and the geometric estimation unit 316.

FIG. 4 illustrates the flow of information between the feature extraction unit 310, the feature indexing unit 312, the feature retrieval unit 314 and the geometric estimation unit 316. In particular, the two modes of operation are show with distinct couplings 420, 430. For example, the first mode is shown with the path of double lines 420 in which the original electronic document 402 is rendered and input via signal line 420 to the feature extraction unit 310. The feature extraction unit 310 outputs feature descriptions for the invisible junctions in the document 402 to the feature indexing unit 312 via signal line 402 and the feature indexing unit 312 creates indexes and stores them in the database 110. The second mode is shown with the path of signal lines 430 in which a patch of video data or a video frame 404 is input via signal line 430 to the feature extraction unit 310. The feature extraction unit 310 outputs feature descriptions for the invisible junctions in the video frame 404 to the feature retrieval unit 314 via signal line 430. The feature retrieval unit 314 queries the database 110 via signal line 430 using the feature descriptions and outputs a list of documents having matching features to the geometric estimation unit 316 via signal line 430. The geometric estimation unit 316 applies geometric constraints to select a matching document, point and viewing region 406.

Invisible Junction Features

The present invention has created and utilizes a novel set of features for document patch recognition. The feature points used for document representation and retrieval are the junctions of the intrinsic skeleton existing in document pages. Since these junctions are not visible, i.e., there are in the blank space of the text document or regions with homogeneous colors, we refer to them here as "invisible junctions" or "invisible junction features". There are four key components in an invisible junction feature:

Location: the coordinate (x, y) of the feature point, with the top-left corner of the document page as the origin;

Orientation: for setting up a local coordinate system for each feature point when we compute the description of each feature point using its neighborhood pixels;

Scale: the size of the feature;

Description: the content of the feature.

Since the feature content will be determined by all of these key factors, it is critical to have them stable and repeatable. For recognition purpose, the descriptor (feature description) must also be discriminative.

Feature Extraction

Referring now to both FIGS. 5A through 5D and 6, one embodiment of a process for performing feature extraction is described. The process begins by receiving 602 a document. In one embodiment, the feature extraction unit 310 receives 602 an ideal model of an electronic document 402. In another embodiment, the feature extraction unit 310 receives 602 a captured image of a printed document such as a video frame or web camera image 404.

Figure 5A:
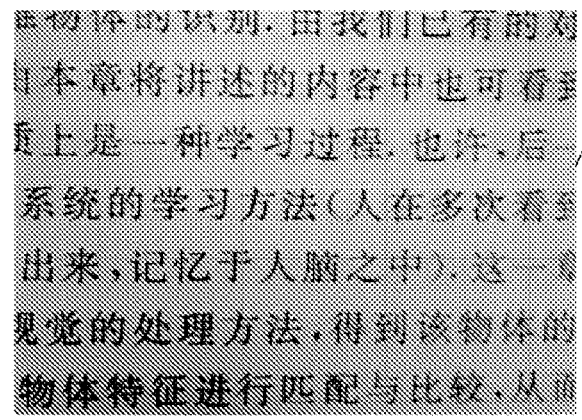
FIGS. 5A to 5E are graphical representations of the steps of feature extraction being performed on an example image in accordance with the present invention including an original input image, a binarization (slightly blurred image) and a distance transform (significantly burred image).
Figure 5A:
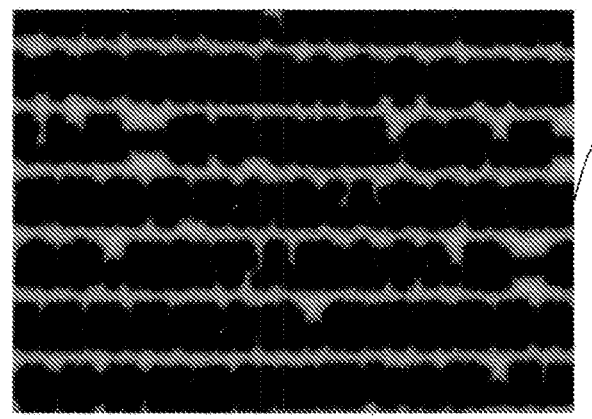
Figure 5B:
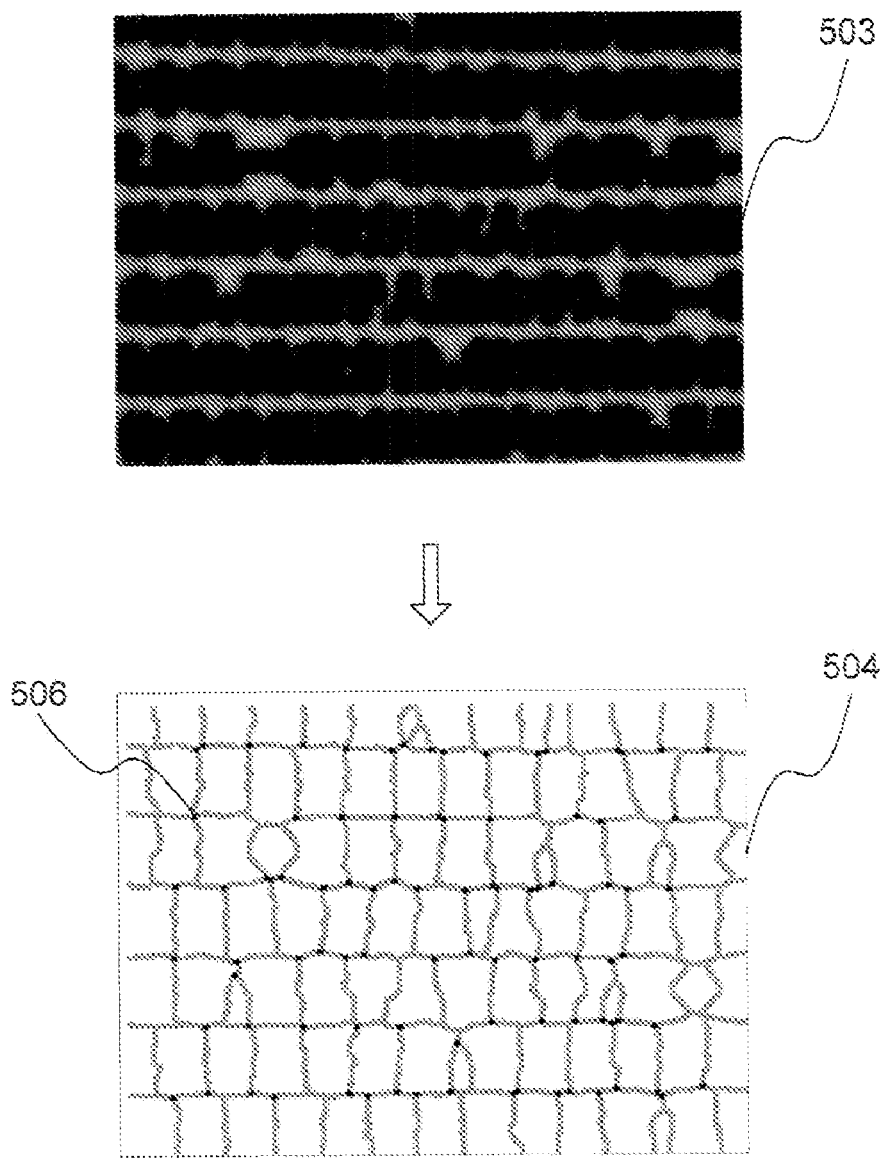

Next, the process determines 604 a location for one or more invisible junctions. In one embodiment, the feature extraction unit 310 detects features at the junctions of the text document skeleton. As shown in FIGS. 5A and 5B for this embodiment, the feature extraction unit 310 binarizes the input image, and then applies a distance transform to the binary image. An example input image 501, the binarization 502 of the input image 501 and the distance transform 503 of the binarization 502 are shown in FIG. 5A. Next a skeleton 504 is detected as boundary of the label fields from the distance transformation. The skeleton 504 alternatively can be the ridge lines of the distance field. In one embodiment, ridge lines are detected as local maxima in one dimension. For the example input of FIG. 5A, the distance transform 503 and skeleton 504 are shown in FIG. 5B. The features are detected as the junction points 506 as shown in FIG. 5B. The junction points 506 alternatively can be the local maxima (in 2D) of the distance transform fields, or the local maxima on the skeleton 504. The use of invisible junctions is particularly advantageous because they are stable and repeatable. The text document contains mostly high frequency image content in the text, which are easily contaminated and hard to filter out without degrading the text. On the contrary, the white space in the text page is mostly stable and contains mostly DC components in the frequency domain. Noise in the white space can be easily filtered out without affecting the feature locations. While the distance transform field depends on the text locations which is desirable since the text content is eventually used for classification, the locations of invisible junction points 506 are robust to noise since the text around each junction are usually contaminated in similar ways.

Figure 5C:
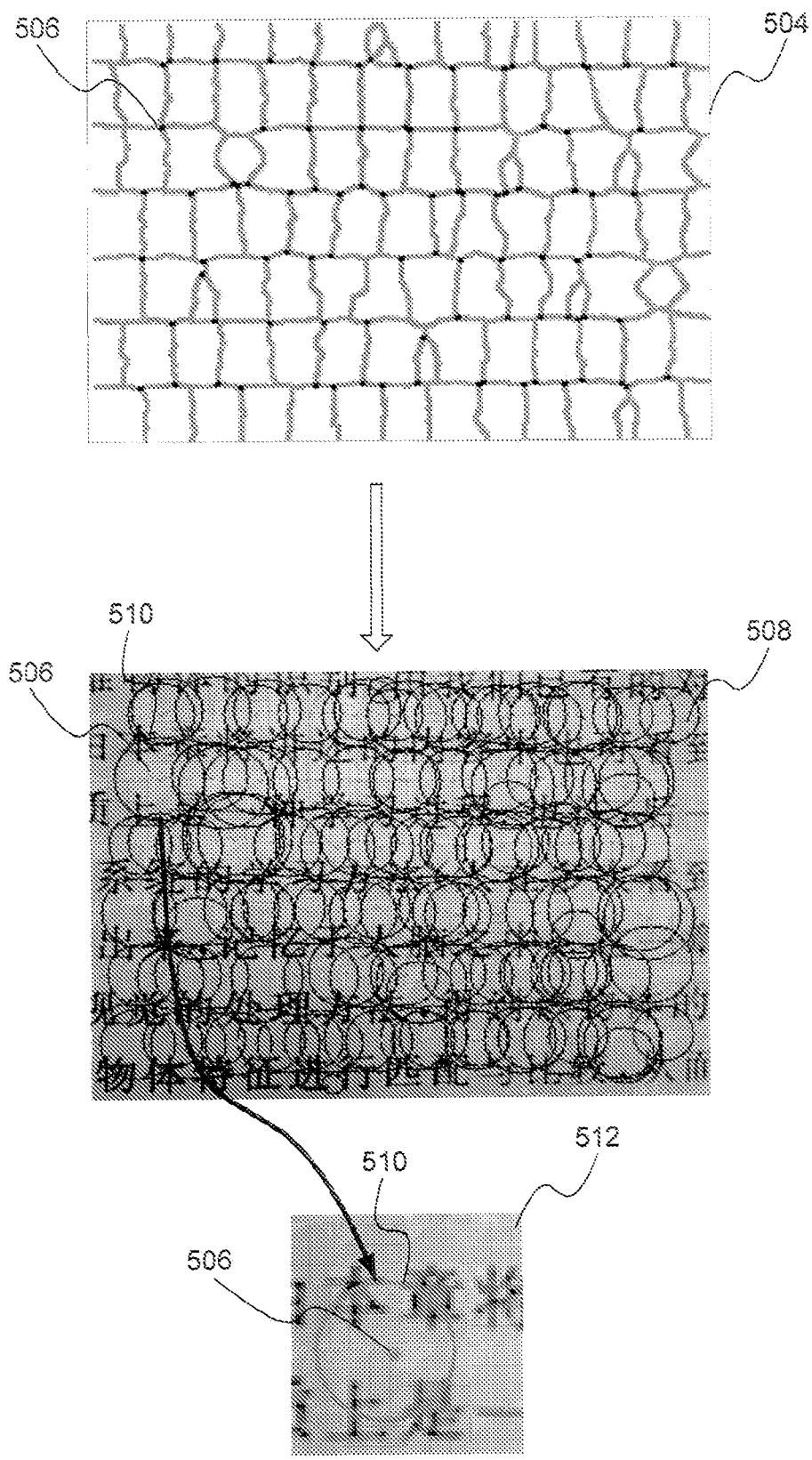

The process next determines 606 a junction size or scale for the invisible junction. In one embodiment, the distance transformation value at each feature point 506 is intrinsic to the feature point 506. The scale of the feature point 506 is thus assigned as such distance value multiplied by a factor $\alpha$. As shown in FIG. 5C in the expanded view 512, $\alpha$ is selected as equal to 2 for this example. The content inside the circle 510 (centered at the feature point 506 with radius equal to its scale) is invariant to camera in-plane rotation and zoom (or distance to the paper document when the camera optical axis is perpendicular to the paper). Since the feature is local, i.e., the circle is small, the feature is also robust to changes in camera viewing angles with respect to the paper (out-of-plane rotation). In other words, while global perspective distortion is apparent, locally such perspective effect is very small, and the effect on the final feature descriptor is negligible for a large range of camera out-of-plane rotations. Like the location, the scale of the invisible junction is stable and repeatable. The scale is computed based on the skeleton, and is therefore stable. However, compared to location and orientation, scale is mostly subject to the changes of the nearby texts. In one embodiment, this effect is reduced by applying a weight that is inversely-proportional to the distance value when computing the feature descriptors.

Figure 5D:
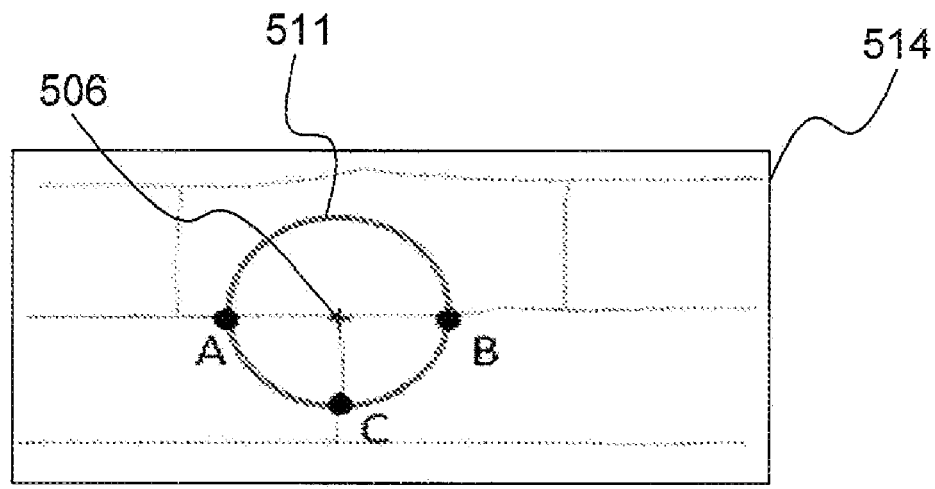

Next, the process determines 608 an orientation for the invisible junction 506. In one embodiment, each feature point 506 is assigned a local orientation. A 2D local coordinate system for each feature point 506 is then determined with the feature location as the origin and its local orientation as the x-axis. The feature descriptor is computed based on this local coordinate system. To derive the local orientation, the feature extraction unit 310 calculates a circle 511 centered at the feature point 506, with a radius determined by the feature scale. This circle 511 intersects the skeleton at several positions. The two positions that are furthest apart (from among all pairs of positions on the circle that intersect the skeleton) determine the local orientation of this feature. If there are two pairs of positions with similar distances, the feature extraction unit 310 selects the one that is closer to a horizontal orientation. FIG. 5D illustrates an example of estimation of feature orientation. The circle 511 centered at the feature point 506 with radius equal to feature scale intersects the skeleton 504 at three points A, B, and C. The two points A and B has largest distance, the feature orientation is therefore assigned as the direction of the line segment AB. Since local orientations are sensitive to noise, and some of the orientations may even be outliers, the feature extraction unit 310 makes a global orientation estimate. Specifically, feature points with local orientations vote for a global orientation for the query image. The voting is done by counting the number of local feature orientations in 360 bins (one degree for each bin). The dominant mode of the orientation histogram is the selected as the global orientation. After voting, every feature point is re-assigned its orientation to be consistent with the selected global orientation. In one embodiment, the feature extraction unit 310 uses a soft split scheme when counting the numbers for the histogram to ensure that the histogram will smoothly change when disturbed by noise.

For text patches, the global orientation is stable since there is indeed a dominant orientation, which is also true for most other non-text documents. The present invention can also be adjusted to achieve a tradeoff between pure local orientation and pure global orientation. Specifically, for each feature point, the feature extraction unit 310 can aggregate orientations from its neighbors (as compared to from all feature points in the same image) to determine its orientation. This will resolve the issue that in some languages, such as Chinese or Japanese, the document page could contain both vertical and horizontal text lines.

The orientation of a junction is determined by this skeleton which is stable as discussed above, and is therefore also stable. This is in contrast to the prior art SIFT, where the local orientation is determined by gradients of pixels around the feature point. It is well known that gradient operation amplifies noise, and therefore makes the feature orientation sensitive to noise. Our local orientation is derived from the skeleton and is much more stable. The global voting step makes the feature orientation even more stable, as it utilizes the fact that the camera is looking at a planar page, and also the fact that such page has some dominant orientation in its invisible skeleton.

Figure 5E:
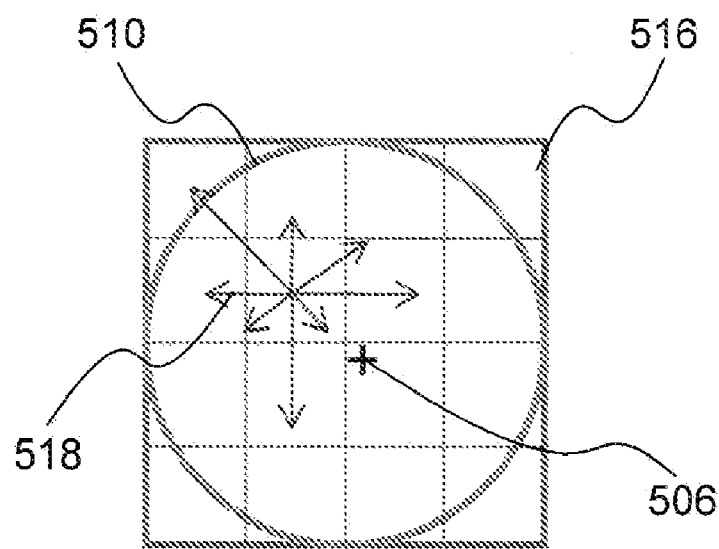
Figure 6:
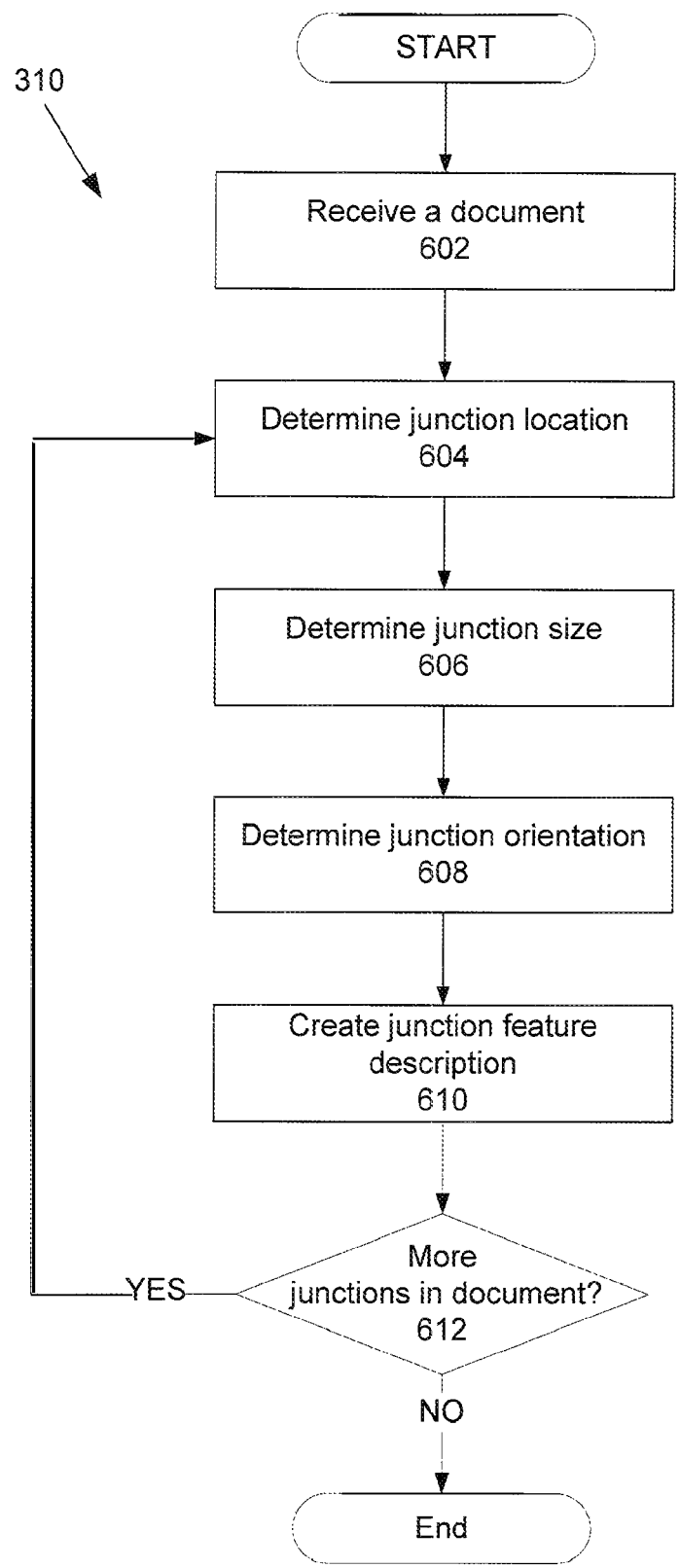
FIG. 6 is a flow chart of an embodiment of a method for performing feature extraction in accordance with the present invention.

Next, the process creates 610 a descriptor or feature description for the invisible junction. Referring now also to FIG. 5E, once the location, scale and orientation are determined for a feature, the feature extraction unit 310 assigns a 2D coordinate frame 516 for each feature point 506, and computes its descriptor 518 inside such coordinate frame 516. For each feature, the feature extraction unit 310 computes a square with edge length equal to two times the feature scale. This square is divided into 4×4 cells. In an alternate embodiment, the feature extraction unit 310 can use concentric circles to construct the cells. Inside each cell, the feature extraction unit 310 accumulates a weighted gradient orientation histogram that has 8 bins (i.e., 8 directions). The gradient can be calculated by several techniques including the well known Roberts or Sobel operators. The feature descriptor is the concatenation of such orientation histograms, resulting in a 128-dimensional feature vector. This feature vector is normalized to accommodate linear lighting changes.

In one embodiment, the feature extraction unit 310 applies dimension reduction scheme using Principal Component Analysis (PCA), and reserves the first 14 dimensions. While this might reduce the discriminative power of the features, it helps reduce the noise. For this embodiment, since the cells nearby the center are mostly blank, the dimension reduction is more sensible. This advantageously produces features that are intrinsically low-dimensional, considering that for each class there is only one prototype in our case. The descriptor of the present invention is particularly advantageous because it is discriminative and repeatable. Repeatability is a result of the repeatability of feature location, orientation and scale. As can be seen, the content of each feature point contains pixels from three or more words in the text document. These contents from different words are put together with some specific layout, making the descriptor very discriminative, as there are few chances for such feature point to duplicate in other places, with the same nearby words being put together with same layout. The quantization (4×4 cell and 8 directions) also make the descriptor robust to noise.

Finally, the process determines 612 whether there are more invisible junctions in the document. If so, the method selects an unprocessed junction and continues in step 604 to process it. If there are no more invisible junctions, the processing of the document is complete and ends.

Feature Indexing

As was noted above, the feature indexing unit 312 generates one or more indices of invisible junction feature descriptors and stores them in the database 110. For each model image, the feature indexing unit 312 extracts the feature points and stores them in the database 110. The feature indexing unit 312 also stores metadata associated with each feature point, including location (x, y), orientation, scale, feature descriptor and a unique ID of the document page that contains this feature point. In order to allow fast real time matching and retrieval, the feature indexing unit 312 also indexes this data for efficient storage in and retrieval from the database 110.

Figure 7A:
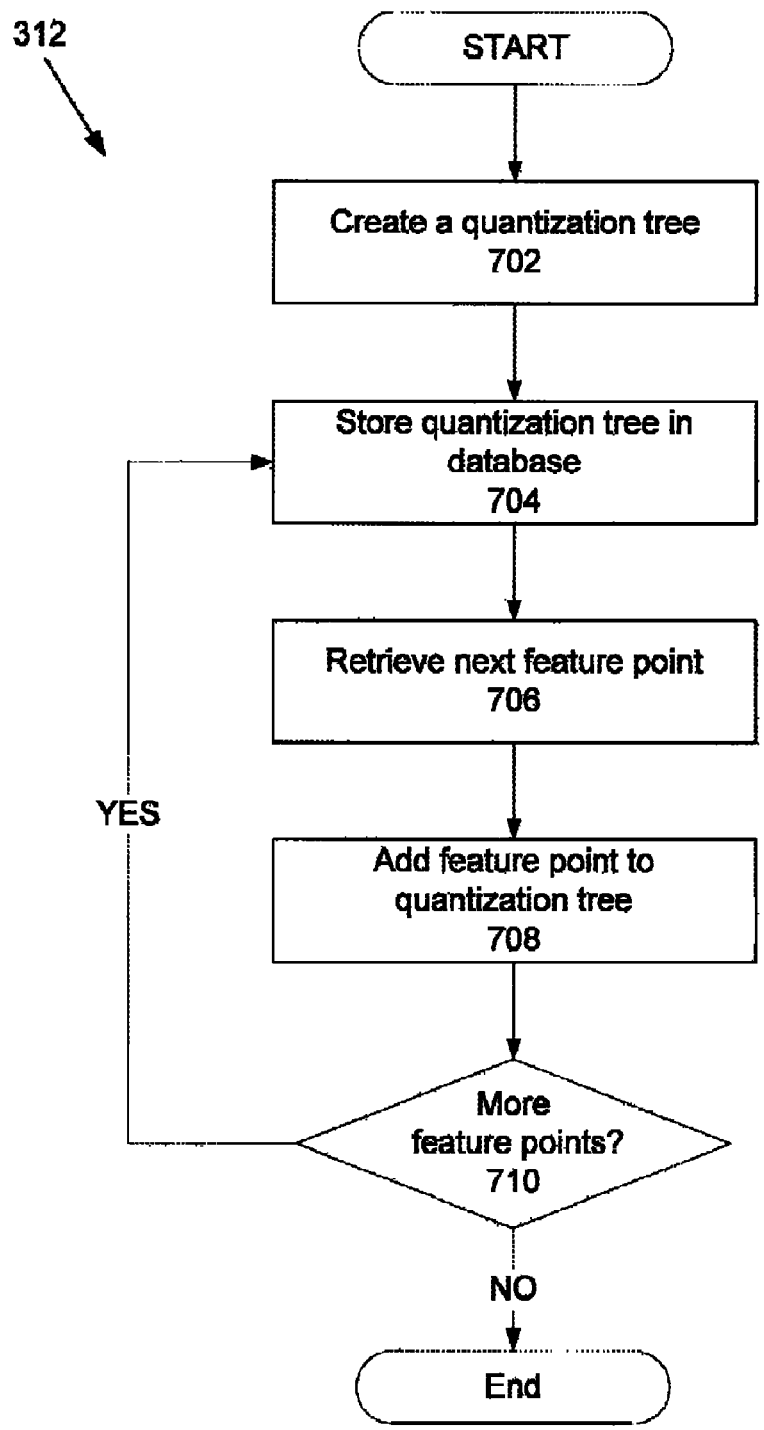
FIG. 7A is a flow chart of an embodiment of a method for performing feature indexing in accordance with the present invention.

Referring now to FIG. 7A, one embodiment of a method for performing feature indexing in accordance with the present invention is shown. The process begins by creating 702 a quantization tree. In one embodiment, the quantization tree is trained by a set of training features using hierarchical clustering. The training set is recursively divided into K clusters. For a quantization tree with K branches and L levels, there is $K^L$ leaf nodes, i.e., the vocabulary size is $K^L$. For clustering the feature indexing unit 312 uses k-means algorithm with multiple random initializations. At each node of the tree, the feature indexing unit 312 records the cluster center given by the points belonging to this node. Each node of the quantization tree is also associated with a node, using term-frequency-inverse-document-frequency. The quantization tree partitions the feature space in a hierarchical way. Once the quantization tree is created, it is stored 704 in the database 110. Next, a feature point is retrieved or received 706 from the feature extraction unit 310, and is pushed down the tree and added 708 to the database. At each level of the tree, the feature point chooses the branch with a cluster center closest to the feature point. Once the feature point reaches the leaf node, an entry for this feature point is inserted into the hit list of this leaf node, recording the page ID and coordinates (x, y) of this feature point. If the page ID is already present in the hit list, the feature indexing unit 312 appends the coordinates to that existing entry, and increments the frequency of the appearance of that page ID in the hit list. Since the feature point may be at or near to the boundary between two clusters, the feature indexing unit 312 uses a soft split when pushing a feature point down the quantization tree. However this results in a large number of leaf nodes hit by such feature point. As a trade off, the feature indexing unit 312 only inserts the feature point into the closest k (k=2 for now) leaf nodes.

In an alternate embodiment, the feature indexing unit 312 does not store the original feature descriptors. Once the feature indexing unit 312 quantizes the feature space, it can approximate the feature descriptor by its index of its residing cell in the quantization space. For each feature, the feature indexing unit 312 only stores the document page ID that contains this feature, as well as the coordinate of the feature inside the document page. The storage space requires is thereby dramatically reduced.

Figure 7B:
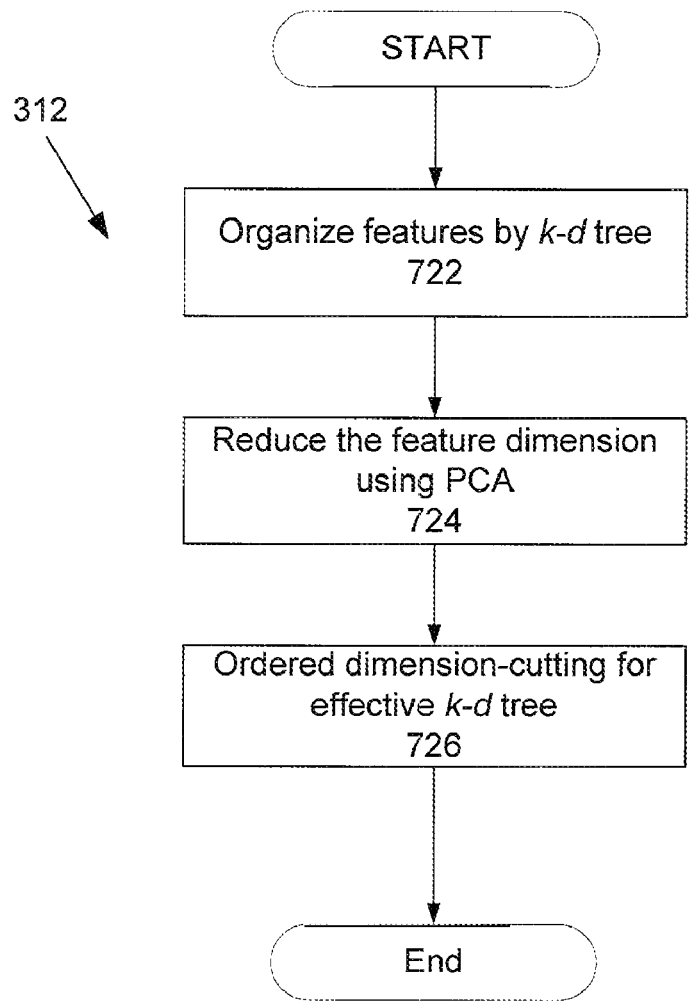
FIG. 7B is a flow chart of an alternate embodiment of a method for performing feature indexing in accordance with the present invention.

Referring now to FIG. 7B, another embodiment of a method for performing feature indexing in accordance with the present invention is shown. In this embodiment, the feature indexing unit 312 uses use the traditional k-d tree to organize 722 the feature points. In another embodiment, the traditional k-d tree can be modified to extend the k-d tree for fast disk I/O. The k-d tree partitions the feature space into cells where each cell contains one or more feature points (actually pointers to feature points). During k-nearest neighbor search, it is often required to back-track the tree. The feature indexing unit 312 uses a depth-first linearization of the tree to order the feature points; in such a way that memory/disk locality during back-tracking is preserved. As a result, the cache miss rate is reduced (cache could be the CPU cache if the features reside in the main memory, or memory cache if the features reside in external hard disk drive), and the speed performance can be increased. Then the feature indexing unit 312 uses PCA to reduce the feature dimension 724, or more exactly, to find the useful dimensions. Even though our data is intrinsically low dimensional, the low-dimensional space needs to be estimated so that the result k-d tree is well-balanced. The significance of such dimension reduction is not only to meet the low-dimension requirement, but also to order the feature dimensions in such a way that the space partition is most effective. In other words, the space cut is ordered 726 in such a way that the dimension with most energy will be cut first, so that the system 108 can achieve a k-d tree that is not only balanced, but also with cell boundaries that are stable (i.e., small noises will not disturb which cell should the feature belong to).

Feature Retrieval and Geometric Estimation

Figure 8:
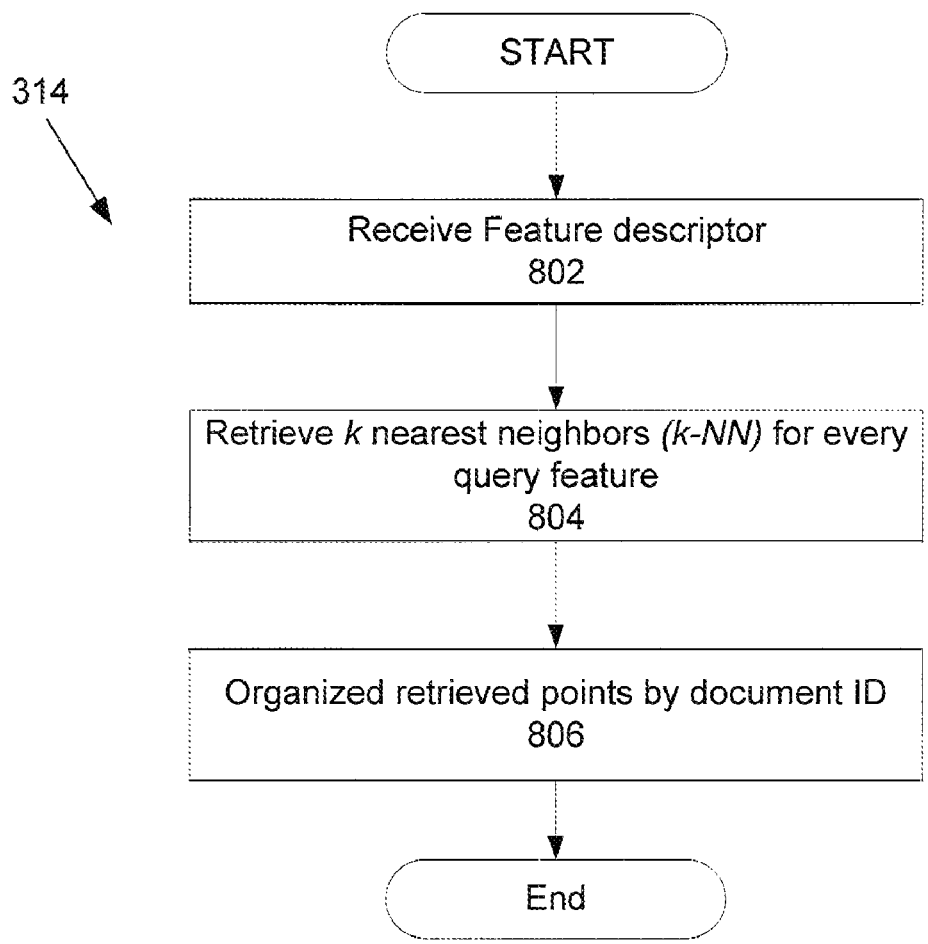
FIG. 8 is a flow chart of an embodiment of a method for feature retrieval in accordance with the present invention.

Referring now to FIG. 8, an embodiment of a method for feature retrieval in accordance with the present invention is shown.

Where indexing is done in accordance with the first embodiment described above with reference to FIG. 7A, the feature retrieval unit 314 sends the feature points detected in the query image down to the quantization, and collects the hit lists at the leaf nodes. This produces a table of candidate document pages, along with a list of coordinates (x, y) for each candidate page. This can be send to the geometric estimation unit for further processing.

In the alternate embodiment of indexing in FIG. 7B, the retrieval process begins with the feature retrieval unit 314 receiving 802 a feature descriptor from the feature extraction unit 310. The feature retrieval unit 314 performs pattern recognition based on local features. The feature retrieval unit 314 searches for the page document whose feature points best corresponded to the feature points of the given query image patch. To establish the correspondence (in other words to recognize), the feature retrieval unit 314 recognizes each feature point in the given image. More specifically, the feature retrieval unit 314 searches 804 the database 110 for the k nearest neighbors (kNN) of a feature point from the query image. The collection of all such points from the database is then divided 806 into sets where points in one set share the same document page ID (recorded as meta-data with the feature point in the database). So for each candidate document page, the feature retrieval unit 314 produces a set of feature correspondences. Note that many of such correspondences are outliers, since for each query point there is at most one true correspondence in its k nearest neighbors.

Those skilled in the art will recognize that various values of k can be used. In one example embodiment, k=10. Other values of k can be used in order to reduce the query time. On alternate method also monitors the distance between the query feature and the current neighbor. Once there is a big jump in the distance, the feature retrieval unit 314 returns k<10 neighbors as the following neighbors are probably outliers (i.e., the true correspondence is probably already in the current k<10 points).

In yet another embodiment, the feature retrieval unit 314 may include scoring using tree-intersection. For each query image, the feature retrieval unit 314 includes a tree representation given the paths that the query points have gone through. The feature retrieval unit 314 constructs a similar tree for each candidate page. The similarity of the query image and a model image is then computed based on the intersection of the two trees. Thereafter the tree intersections can be ranking.

Figure 9A:
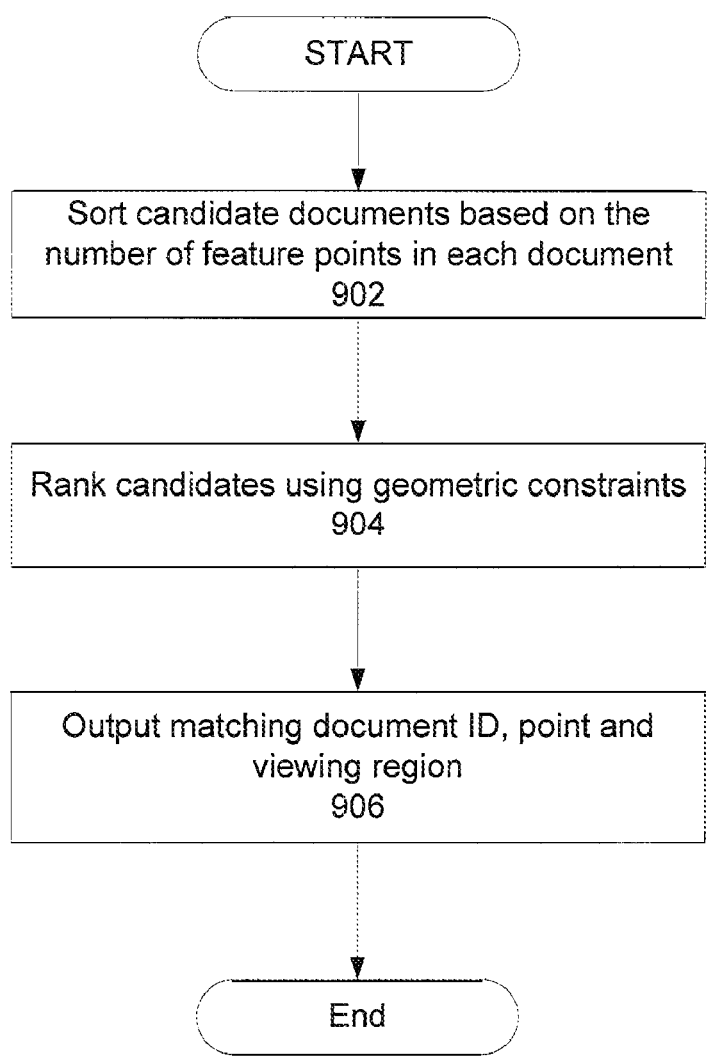
FIG. 9A is a flow chart of a first embodiment of a method for geometric estimation in accordance with the present invention.

FIG. 9A is a flow chart of a first embodiment of a method for geometric estimation in accordance with the present invention. Once all the candidate page identifications have been identified by the feature retrieval unit 314, they are sent to the geometric estimation unit 316 to rank all candidate document page identifications to generate the final query result. The geometric estimation unit 316 begins by sorting 902 the candidate documents using the number of feature points that each candidate document page has. Then the geometric estimation unit 316 ranks the candidates using geometric constraints. For example, the geometric estimation unit 316 selects the document that contains the largest number of feature points consistent with the geometric constraint of the input image's plane, therefore there is a transformation between the paper plane and the camera imaging plane. Finally, the geometric estimation unit 316 outputs 906 the matching document identification, page, point and viewing region.

FIG. 9A is a flow chart of a first embodiment of a method for geometric estimation in accordance with the present invention. Once all the candidate page identifications have been identified by the feature retrieval unit 314, they are sent to the geometric estimation unit 316 to rank all candidate document page identifications to generate the final query result. The geometric estimation unit 316 begins by sorting 902 the candidate documents using the number of feature points that each candidate document page has. Then the geometric estimation unit 316 ranks the candidates using geometric constraints. For example, the geometric estimation unit 316 selects the document that contains the largest number of feature points consistent with the geometric constraint of the input image's plane, therefore there is a transformation between the paper plane and the camera imaging plane. Finally, the geometric estimation unit 316 outputs 906 the matching document identification, page, point and viewing region.

Figure 9B:
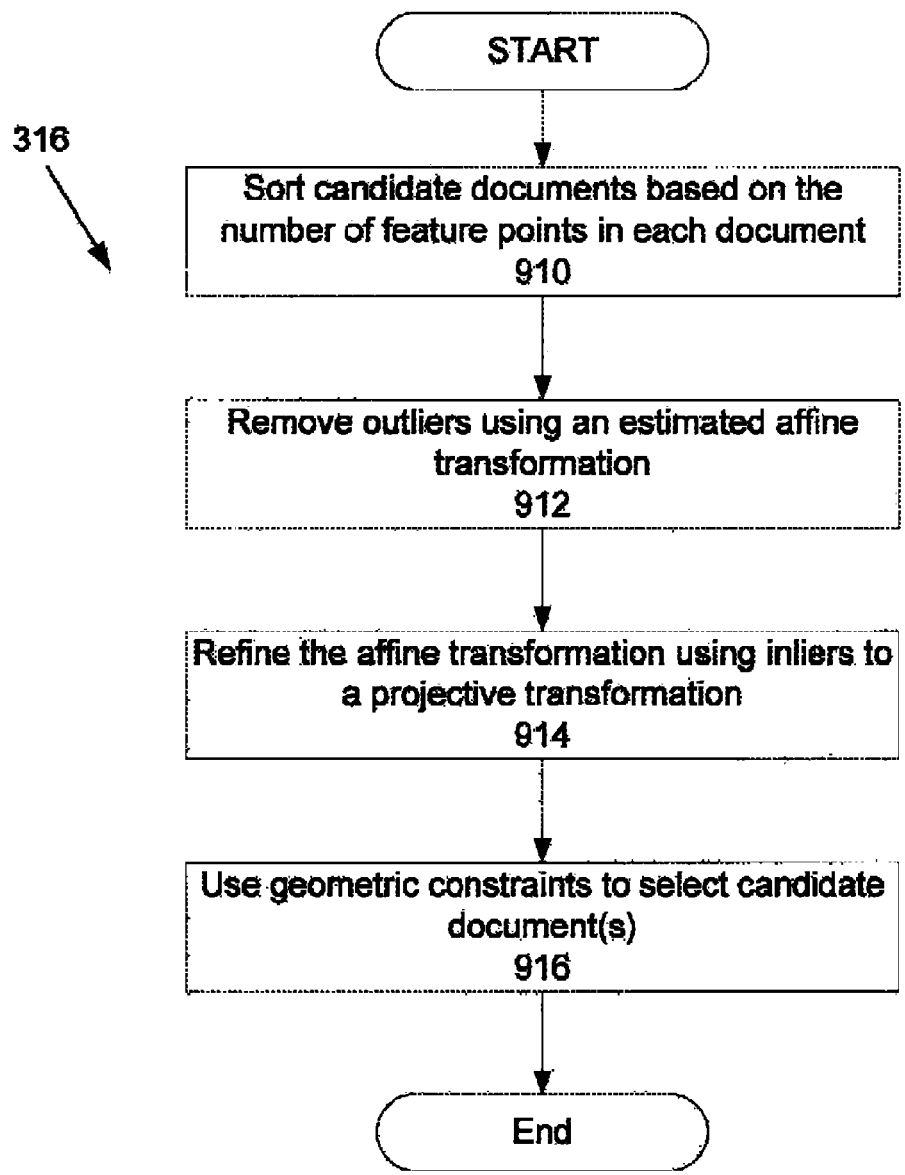
FIG. 9B is a flow chart of a second embodiment of a method for geometric estimation in accordance with the present invention.

Referring now to both FIGS. 9B and 9D, a second embodiment of a method for geometric estimation in accordance with the present invention will be described. FIG. 9B shows the steps of method and FIG. 9D shows the imaging plane 956, the paper plane 952 and the transformation between them. The method begins by receiving the candidate page identifications have been identified by the feature retrieval unit 314, and then the geometric estimation unit 316 sorts 910 the candidate document pages based on the number of feature points in each candidate document page. The geometric estimation unit 316 basically uses a geometric constraint to pick the document that contains the largest number of feature points consistent with that geometric constraint. As shown in FIG. 9D, an example geometric constraint comes from the fact that the document page is a plane 952; thus, there is a perspective transformation between the paper plane 952 and the camera imaging plane 956. Since perspective transformation involves 8 independent parameters, and is a non-linear transformation, its estimation is not stable and more expensive before outliers are removed. The geometric estimation unit 316 therefore removes 912 the outliers with an estimated affine transformation. For example, a RANdom SAmple Consensus (RANSAC) algorithm is used to estimate the affine transformation (a realistic approximation of perspective transformation) and to detect the outliers in the feature correspondences. In one embodiment, the geometric estimation unit 316 also performs a validity checking on the affine transformation estimated by RANSAC. For example, an affine transformation is a generic full-rank 3×3 matrix (with last row being [0, 0, 1]), which contains transformations that are physically invalid for our configuration. More specifically, the upper left 2×2 sub-matrix of the affine transformation can be decomposed into rotation $\alpha$, scales $\lambda_1$ and $\lambda_2$, and another rotation $\phi$:

$$H_{1\,2\,1\,2} = R(\alpha(^{\lambda_1}\lambda_2))R(\phi) \quad (1)$$

In accordance with the present invention, the geometric estimation unit 316 enforces the constraint such that the rotation, scale, skew (the ratio $\lambda_1/\lambda_2$) and translation (the third column of affine transformation H) must be bound. For example, it is impossible for the translation to be out of the scope of the document page.

Once the affine transformation is estimated and the outliers are removed 912, the geometric estimation unit 316 refines 914 the affine transformation using the inliers to a projective transformation. The geometric estimation unit 316 uses non-linear optimization (such as Levenberg-Marquardt optimization) with the initialization by the affine transformation to identify the best candidate documents. Since the projective transformation (as well as affine transformation) also gives an estimation of the camera orientation and image scale with respect to the paper, the geometric estimation unit 316 enforces 916 this orientation and scale to be consistent to the orientation and scale voted by features at the feature detection stage. This selection 916 of the best candidate using the geometric constraints from feature extraction effectively reduces the false positive, in some case essentially to zero.

In alternate embodiment, the steps of refining 914 the affine transformation using the inliers to a projective transformation can be terminated once a close match is found. If the geometric estimation unit 316 identifies a document page that results in a valid geometric transformation with enough inlier support, it can safely return the identified document page, without examining other candidate pages. This further increases the performance of the recognition method of the present invention without significant affects on accuracy.

Figure 9C:
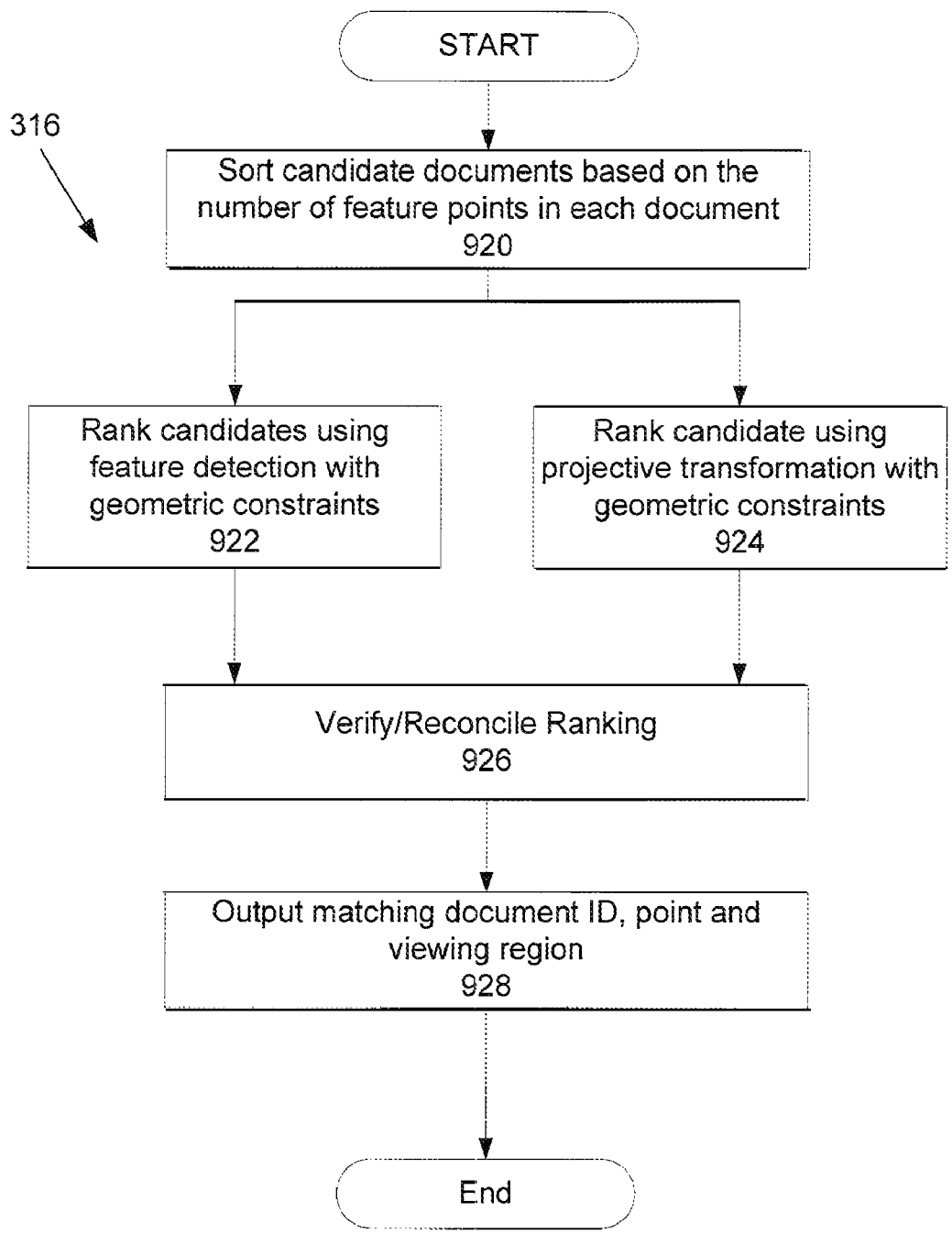
FIG. 9C is a flow chart of a second embodiment of a method for geometric estimation in accordance with the present invention.
Figure 9D:
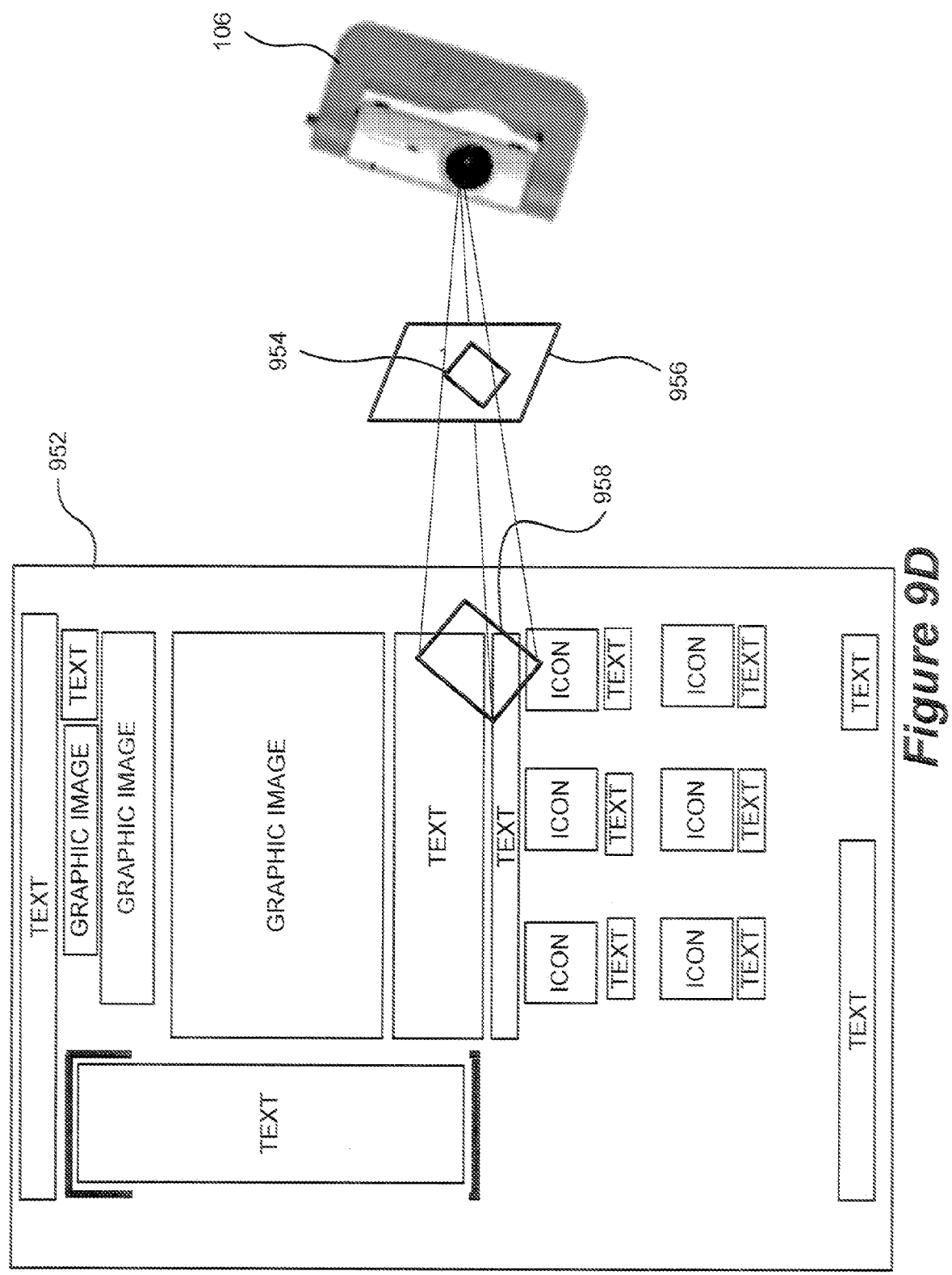
FIG. 9D is a graphical representation of example geometric constraints showing a paper plane, an imaging plane and a query.

FIG. 9C is a flow chart of a third embodiment of a method for geometric estimation in accordance with the present invention. This embodiment illustrates the use of two separate geometric estimations, and their operation in parallel for increased performance. The process begins by receiving the candidate page identifications that have been identified by the feature retrieval unit 314, and then sorts 920 the candidate document pages based on the number of feature points in each candidate document page. The sorted list of candidate pages is then provided for two separate geometric estimations. One geometric estimation ranks 922 the candidate pages using feature detection with geometric constraints. For example, the rotation or orientation and scale attributes of feature detection are enforced in this geometric estimation. A second geometric estimation ranks 924 the candidate pages using a projective transformation with geometric constraints such as discussed above with reference to FIG. 9B. For example, the camera viewing region and look at point attributes in the projective transform are enforced in this second geometric estimation. Those skilled in the art will recognize that these two geometric estimations may be performed in parallel or serially. The two page rankings are then verified or reconciled 926. For example, the verification or validation requires that the features be physically meaningful and that they are consistent with the scale and orientation estimated by the feature extraction unit 310. Once the results of the two geometric estimations are validated to produce a single re-ranked candidate list, the geometric estimation unit 316 outputs the document identification, page, point and viewing region.

Recognition and Tracking

When a user moves the camera over the paper document, for example scanning for hot-spots where electronic data or other annotations are associated with locations on the paper, the present invention does not need to issue a fresh query for each video frame. Instead, the present invention utilizes the previous recognition results for inferring the ID of current frame as well as the camera look-at point on the paper. In order to do this, the present invention tracks the camera to infer its motion with respect to the document page being imaged. Directly estimating the camera 3D motion between two video frames is not reliable, since there are several ambiguities among the 3D camera motion parameters (e.g., out-of-plane rotation vs. translation, zooming in/out vs. moving to/from the paper). To avoid such problems, the present invention directly tracks the 2D camera look-at point on the paper and infers the camera motion state utilizing temporal redundancy. Tracking 2D camera look-at point is realized by tracking feature points across video frames, and then estimating planar motions (projective transformation) between video frames. Furthermore, in addition to using previous results for the recognition of current frame, by tracking the present invention also accumulates information from multiple frames for a fresh recognition, when previous recognition results are not available.

Figure 10A:
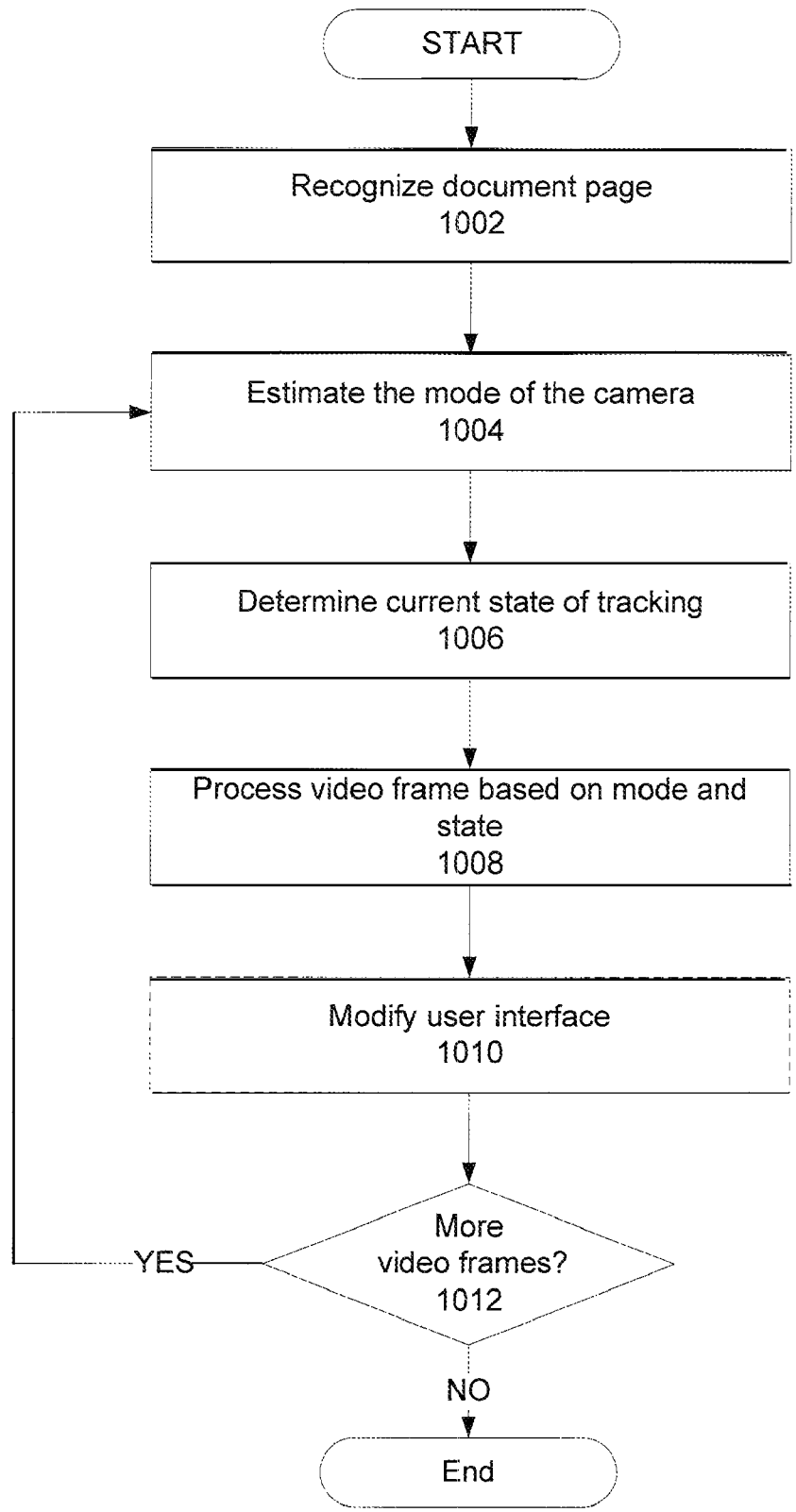
FIG. 10A is a flow chart of an embodiment of a method for combining recognizing and tracking in accordance with the present invention.

Referring now to FIG. 10A, one embodiment for a method for a combined process of recognizing and tracking in accordance with the present invention will be described. The process begins by recognizing 1002 a document page. This initial recognition step 1002 can be performed using any one of the recognition methods described above with reference to FIGS.

9A-9C. Once the feature extraction and recognition system 108 identifies the document page, it tracks the camera look-at point by registering the query image and the result document page. In other words, the feature extraction and recognition system 108 first tries to "recognize" the query image using the previously retrieved page. Furthermore, the feature extraction and recognition system 108 combines frame tracking and recognition. Recognition acts as initialization and the drift corrector 326 tracks continuous video frames.

Figure 10B:
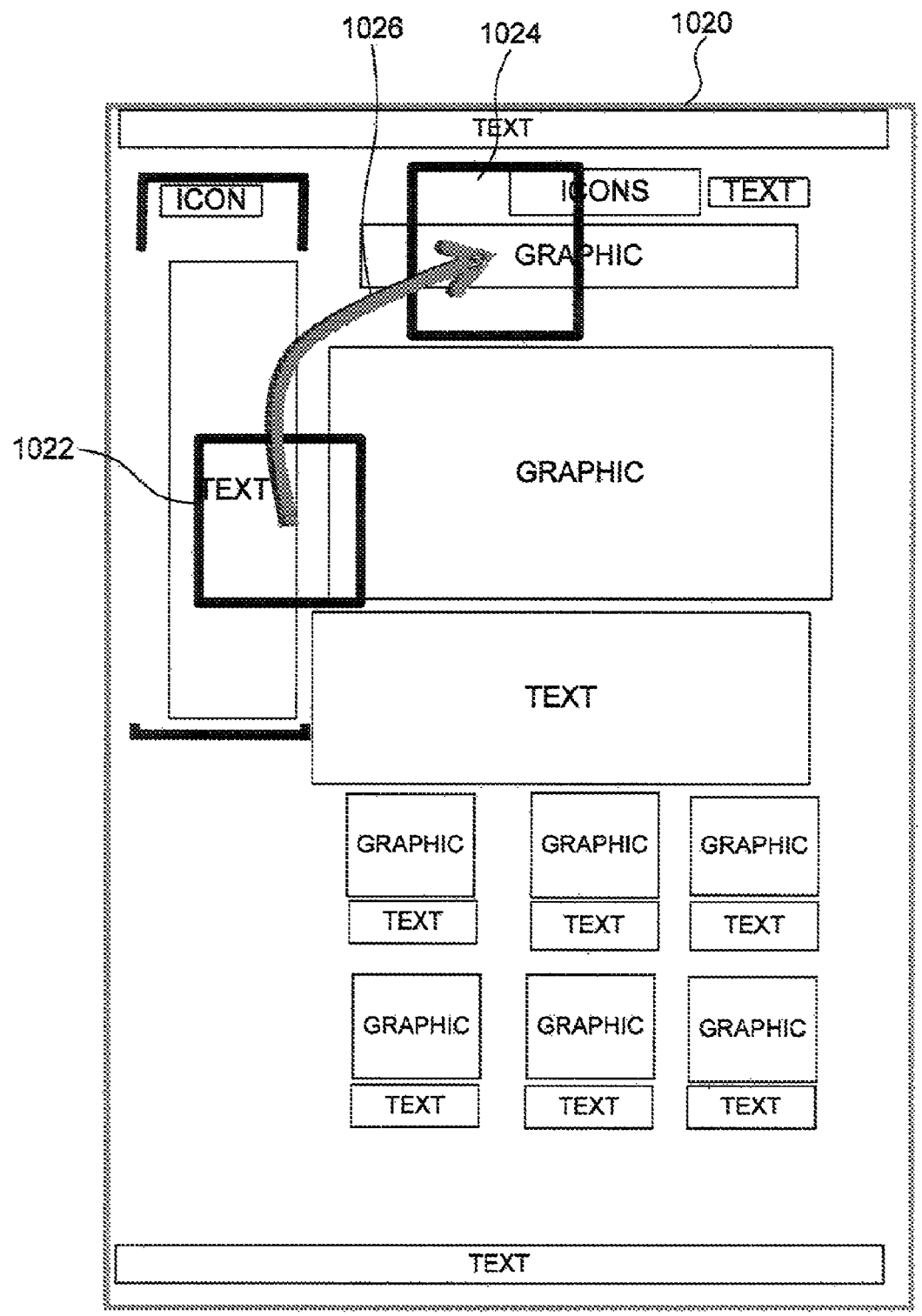
FIG. 10B is a graphical representation of a user interface generated by the method for combining recognizing and tracking in accordance with the present invention.
Figure 10C:
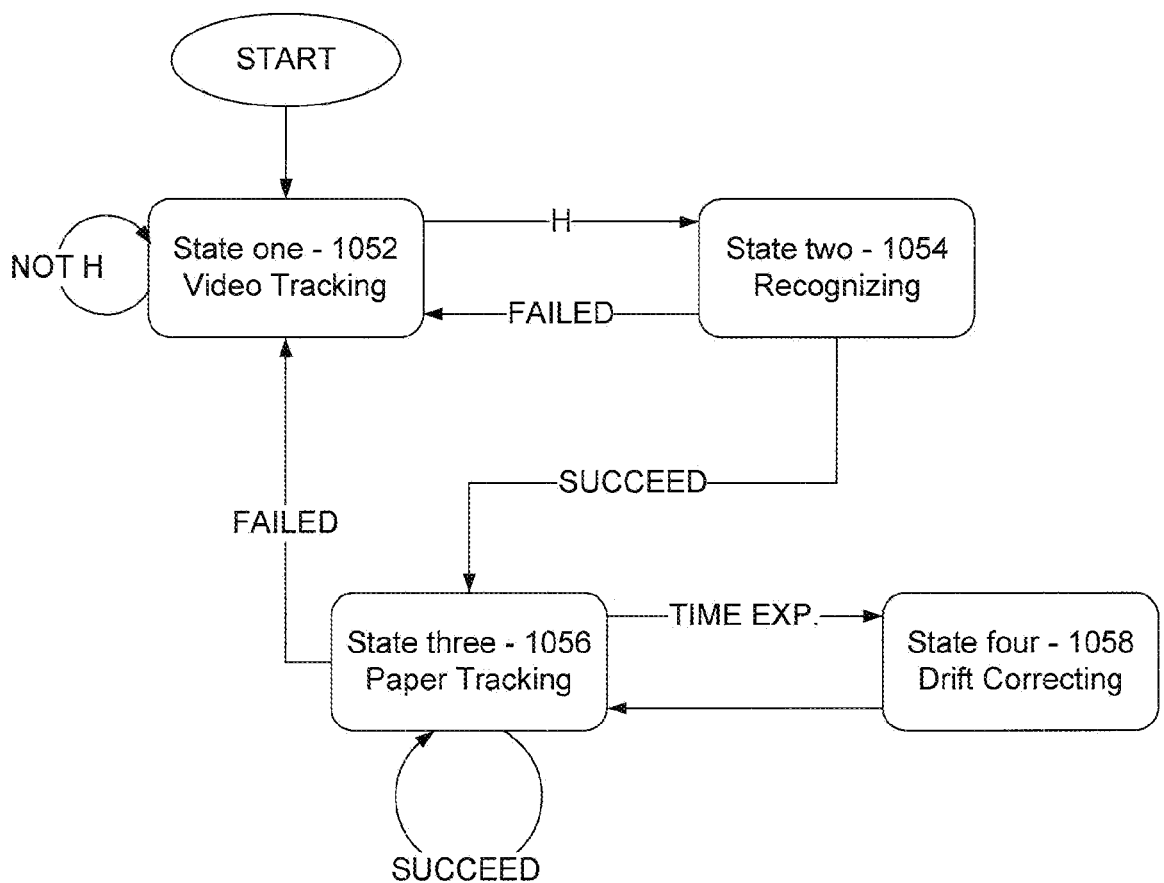
FIG. 10C is a state diagram of a process used by the method for combining recognizing and tracking in accordance with the present invention.

Next, the process of the present invention estimates 1004 the mode of the camera. In this embodiment, the feature extraction and recognition system 108 maintains a state machine for determining when to track, to recognize or to correct the drift for tracking. The state machine is illustrated in FIG. 10C and described more detail below. The changes in the mode of the camera cause transition between states. The feature extraction and recognition system 108 estimates the dynamics mode of the video camera and is defined to have the following states:

Hovering: the camera is mostly steady and looking at the paper document;
Scanning: the camera is scanning the document by translating and/or rotating;
Zooming: the camera is moving to or from the document page; and
Abrupt change: the camera is moving to another document page.

Once the mode has been estimated 1004, the feature extraction and recognition system 108 determines 1006 the current state of tracking. The present invention provides four different states of tracking in which either the video tracker 320, the paper tracker 322, the recognizer 324 or the drift coordinator 326 are active. Depending on the current state of tracking and the camera mode, the process transitions between the video tracking state, recognizing state, the paper tracking state or the drift correcting state. Next, the method of the present invention processes 1008 a video frame based on the estimated camera mode and the determined state.

The information provided by the video tracker 320, the paper tracker 322, the recognizer 324 or the drift coordinator 326 can be used to generate or modify 1010 a graphical user interface. This graphical user interface can be combined with a representation of the electronic document. In one embodiment, the graphical user interface includes a plurality of visual indications 1022, 1024 of viewing regions, a visual indication 1026 of a transition path generated from the from each frames captured by the image capture device 106. These components 1022, 1024, 1026 of the graphical user interface can be overlaid upon an image of the recognized electronic document 1020. A graphical representation of an example user interface generated by the method for combined recognizing and tracking in accordance with the present invention is shown in FIG. 10B. It should be noted that the step of modifying 1010 the graphical user interface is shown in FIG. 10A with dashed lines indicating that this step is optional. The information generated in recognizing and tracking could be used for variety of different applications including a user input control device or an annotation tool for use with a desktop computer, and those skilled in the art will recognize that generating and presenting a graphical user interface is just one application for the combined recognition and tracking method of the present invention.

Once the graphical user interface has been modified, generated or displayed 1010, the method of the present invention determines 1012 whether there are additional input image frames to process. If so the method retrieves the next image frame and returns to step 1004, and performs steps 1004, 1006, 1008 and 1010 on the next image frame. If there are no additional input image frames to process, the method is complete and ends.

Referring now also to FIG. 10C, a state diagram of the process used for recognizing and tracking in accordance with the present invention is shown. The process begins in state one 1052, where the video tracker 320 tracks the camera motion (as a projective transformation) across video frames with the first video frame being the reference frame. As long as the camera mode is not in the hovering mode, the process of the present invention remains in state one 1052. However, if the camera mode changes to the hovering mode, the process of the present invention transitions to state two 1054. In state two 1054, the recognizer 324 is operational. The recognizer 324 recognizes the current video frame and initializes a link between paper and the input video frame. If recognition fails the process of the present invention returns to state one 1052. On the other hand, if recognition succeeds the process of the present invention transitions to state three 1056 because a link between the paper and video frame has been established and the following frames will be processed by the paper tracker 322. In state three 1056, the paper tracker 322 tracks the camera motion with respect to the paper with the paper plane acting as a reference frame. The paper tracker 322 also operates a periodic timer. Once the periodic timer expires, the process of the present invention transitions from state three 1056 to state four 1058. In state four 1058, drift coordinator 326 provides drift correction of the paper tracker 322. This ensures that the alignment between the image and the paper is maintained. Once drift correction has been completed, the process of the present invention returns to state three 1056 and the following frames are processed by the paper tracker 322. As long as paper tracking is successful, the method of the present invention remains in state three 1056 with periodic transitions to and from state four 1058 for drift correction. However, if paper tracking is not successful, the method of the present invention returns to state one 1052 and the following frames are processed by the video tracker 320.

It should be noted that a feature point appears multiple times in a video clip. By tracking the present invention associates these examples of a same feature point, and uses them together to retrieve the kNN of such feature point. For example in an alternate embodiment, the present invention can perform super-resolution by integration over time, or even simply choose the instance with best resolution or viewing angle for retrieval. When given a new frame to be recognized, many of the feature points might already have their ID and therefore k-nearest neighbors from previous frames. As a result, the present invention is able to eliminate many kNN retrievals by simply tracking feature points across video frames.

Referring now to FIGS. 10D-10K, graphical representations for an example user interface generated by the combined recognizing and tracking in accordance with the present invention are shown. For this example, the user interfaces provided are for a portable computing device such as a smart phone. Those skilled in the art will recognize that this display format is only used by way of example and that the components of the graphical user interface may be used in a variety of other configurations. Furthermore, the particular color, format, shape and appearance of the visual representations are provided only by way of example and any number of other visual representations may be used. Throughout the description of FIGS. 10D-10K like reference numerals are used to indicate like components with the same or similar functionality.

Figure 10D:
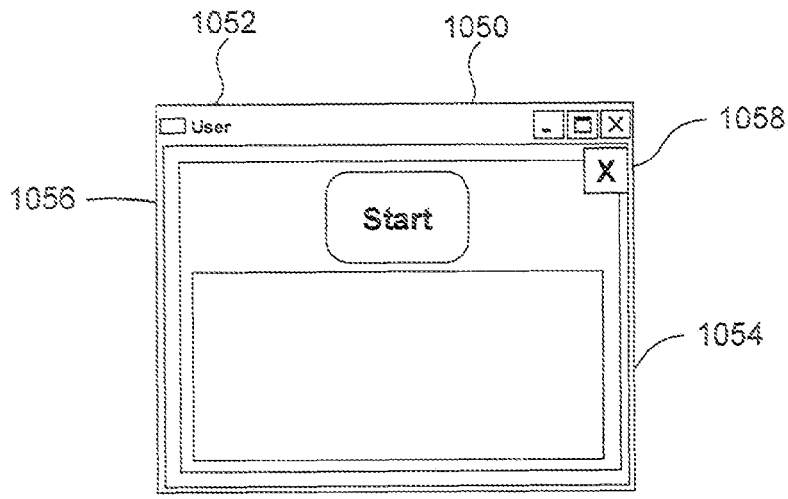
FIGS. 10D-10K are graphical representations of another embodiment for a user interface generated by the combined recognizing and tracking in accordance with the present invention.

FIG. 10D illustrates an example graphic user interface (GUI) including a window 1050 having a label 1052 with a conventional format. Within the window 1050, is a display area 1054 for showing the recognition and tracking GUI. Display area 1054 includes a selectable start button 1056 and a button 1058 for closing the window of the display area 1054. Once the start button 1056 has been selected, the GUI is updated to the display shown in FIG. 10E.

Figure 10E:
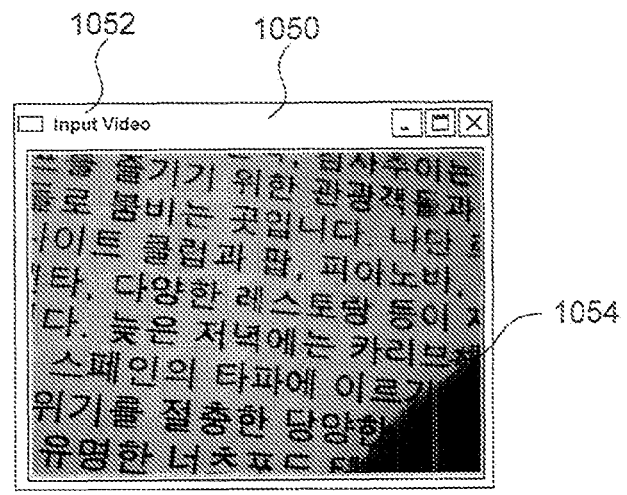

FIG. 10E illustrates the GUI with the display area 1054 showing the first input image. In other words, the GUI displays the input query image that is being captured by the camera or input device 106. After the GUI of FIG. 10E has been displayed the method transition to showing the GUI of FIG. 10F.

Figure 10F:
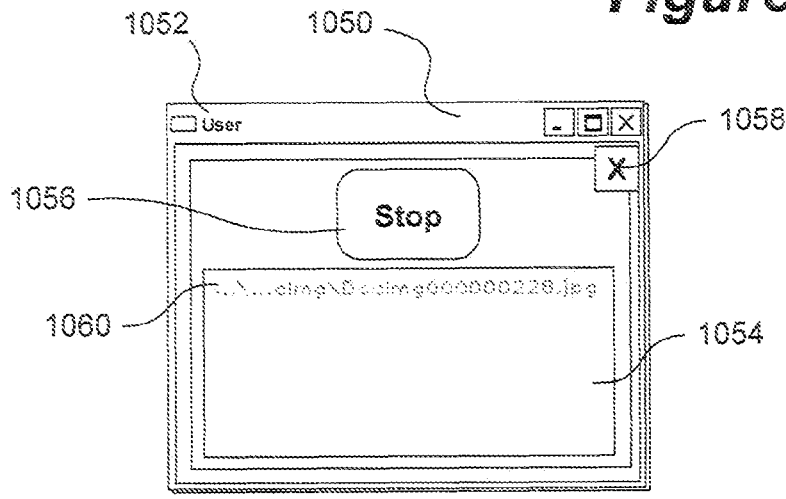

FIG. 10F illustrates the GUI with the display area 1054 after recognition has succeeded. Once recognition has succeeded, the GUI shows the full pathname 1060 of the electronic document recognized by the system 108 in the display area 1054. The button 056 in the GUI is also modified to be a stop button 1056. After the GUI of FIG. 10F has been displayed the method transitions to showing the GUI of FIG. 10G.

Figure 10G:
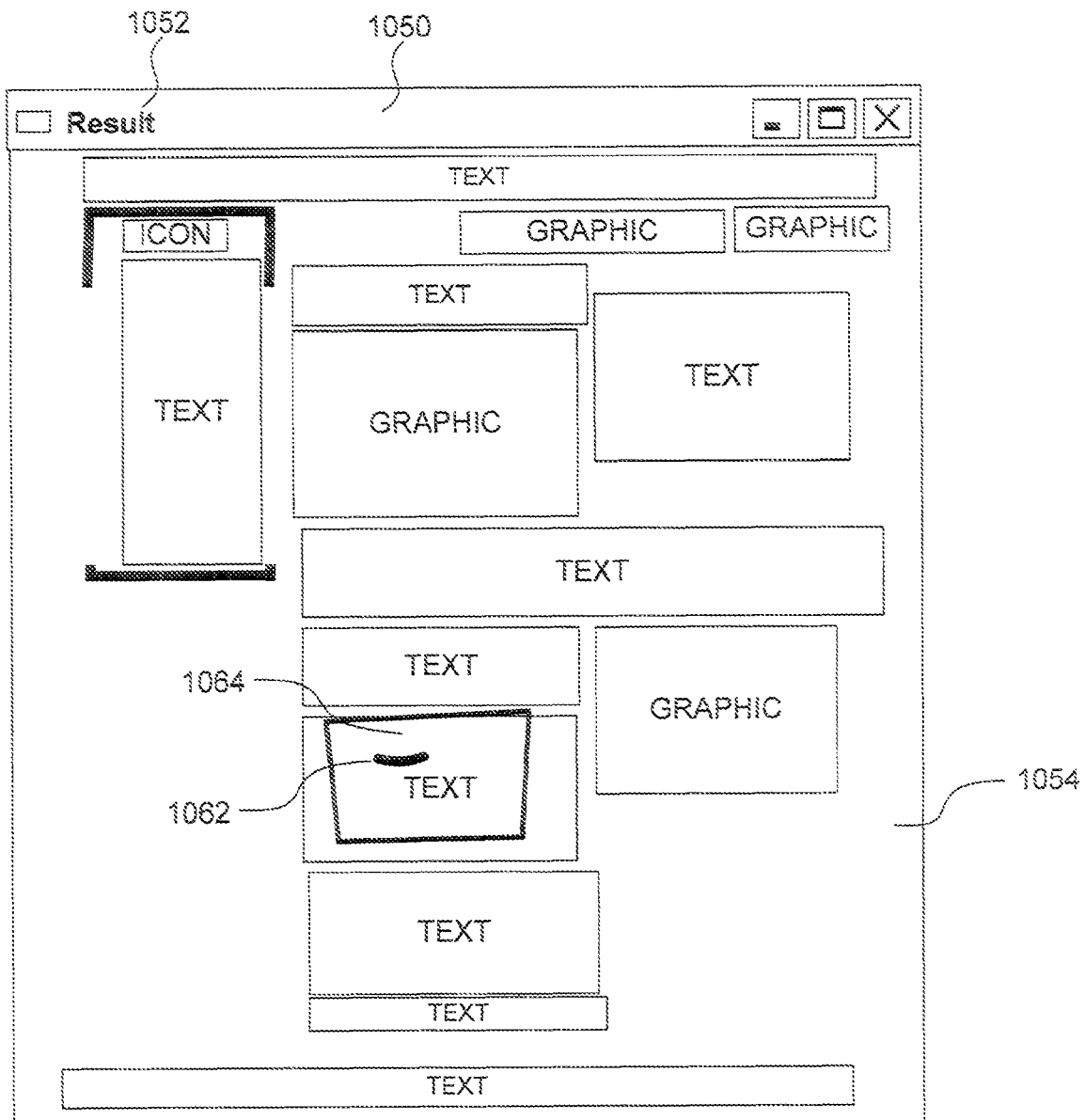

FIG. 10G illustrates the GUI showing a representation of the original electronic document in the display area 1054. Overlaid on top of this representation is a camera viewing window 1062 and a plurality of camera-look-at points 1064 as recognized by the present invention. This is the interface shown during operation of the paper tracker 322. This view is particularly advantageous because of the very specific alignment of a point on the paper with a point in the electronic document, and especially the visual feedback provided to the user indicating that relationship.

Figure 10H:
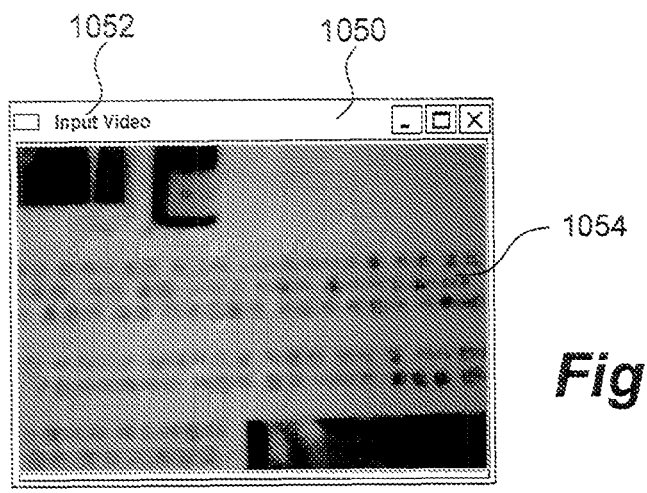
Figure 10I:
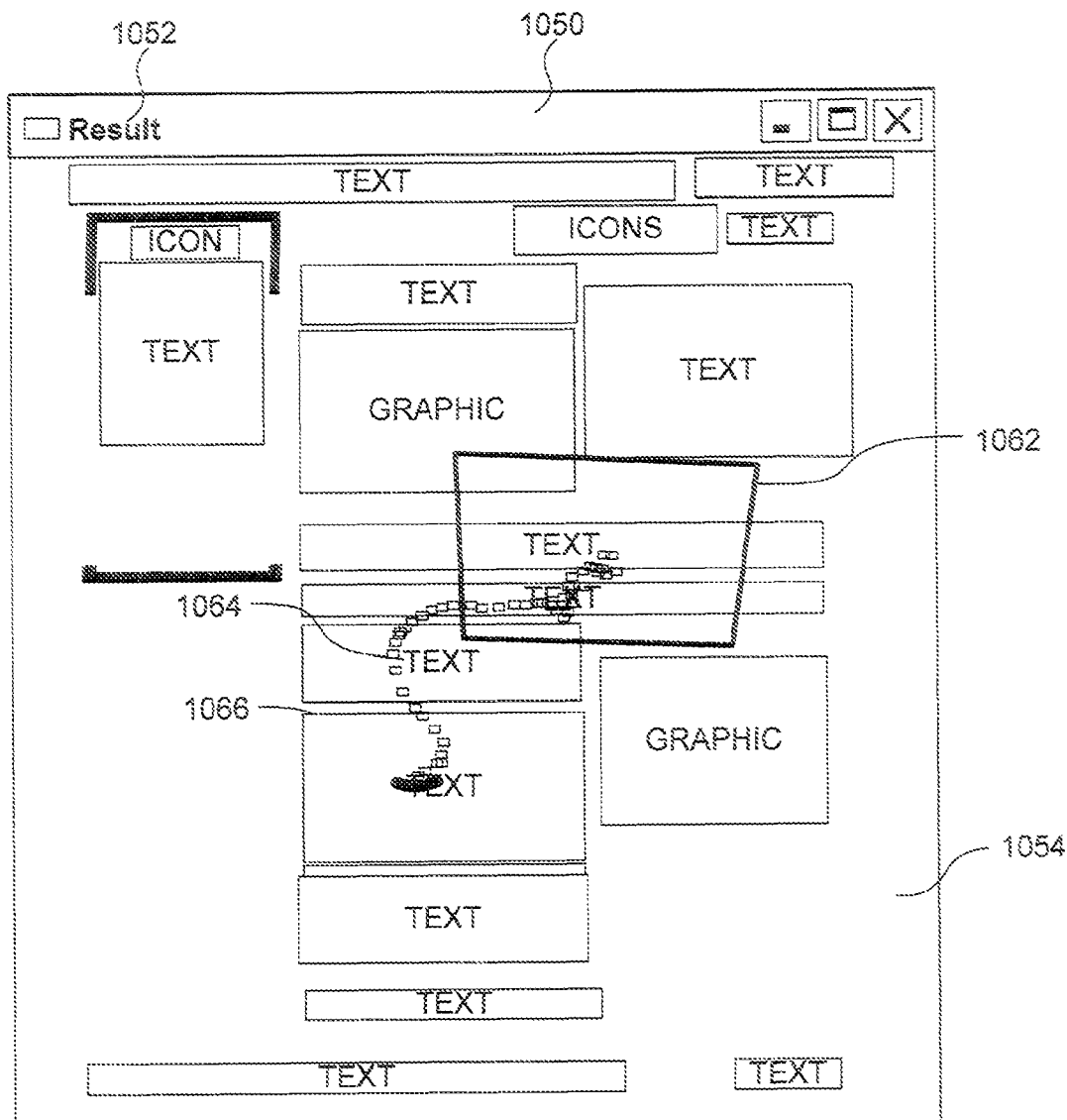

FIG. 10H illustrates the GUI showing a blurry image that cannot usually be recognized in the display area 1054. After the recognition and tracking process of the present invention has been operational for a small amount of time, the redundancy in the images input allows recognition. FIG. 10T illustrates the GUI including a representation of the electronic document shown in the display area 1054 overlaid with a viewing window 1062 and camera-look-at points 1064. The camera-look-at points 1064, 1066 in this embodiment are represented by green squares. The positions of these green squares 1064, 1066 show the trajectory of the camera tracking results. The present invention advantageously makes an image that was initially unrecognizable, recognizable after a small matter of time because the number of frames with redundant data that are processed. For example, within a matter of a few seconds, and initially unrecognizable image can be transformed into the recognizable image and the GUI created with the visual representations of the present invention as shown in FIG. 10I.

Figure 10J:
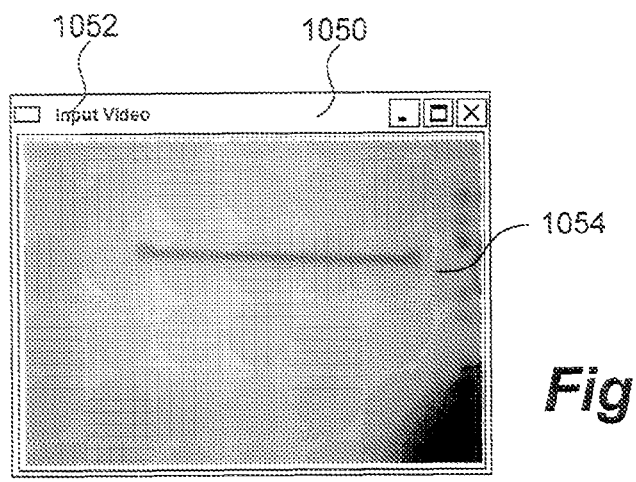
Figure 10K:
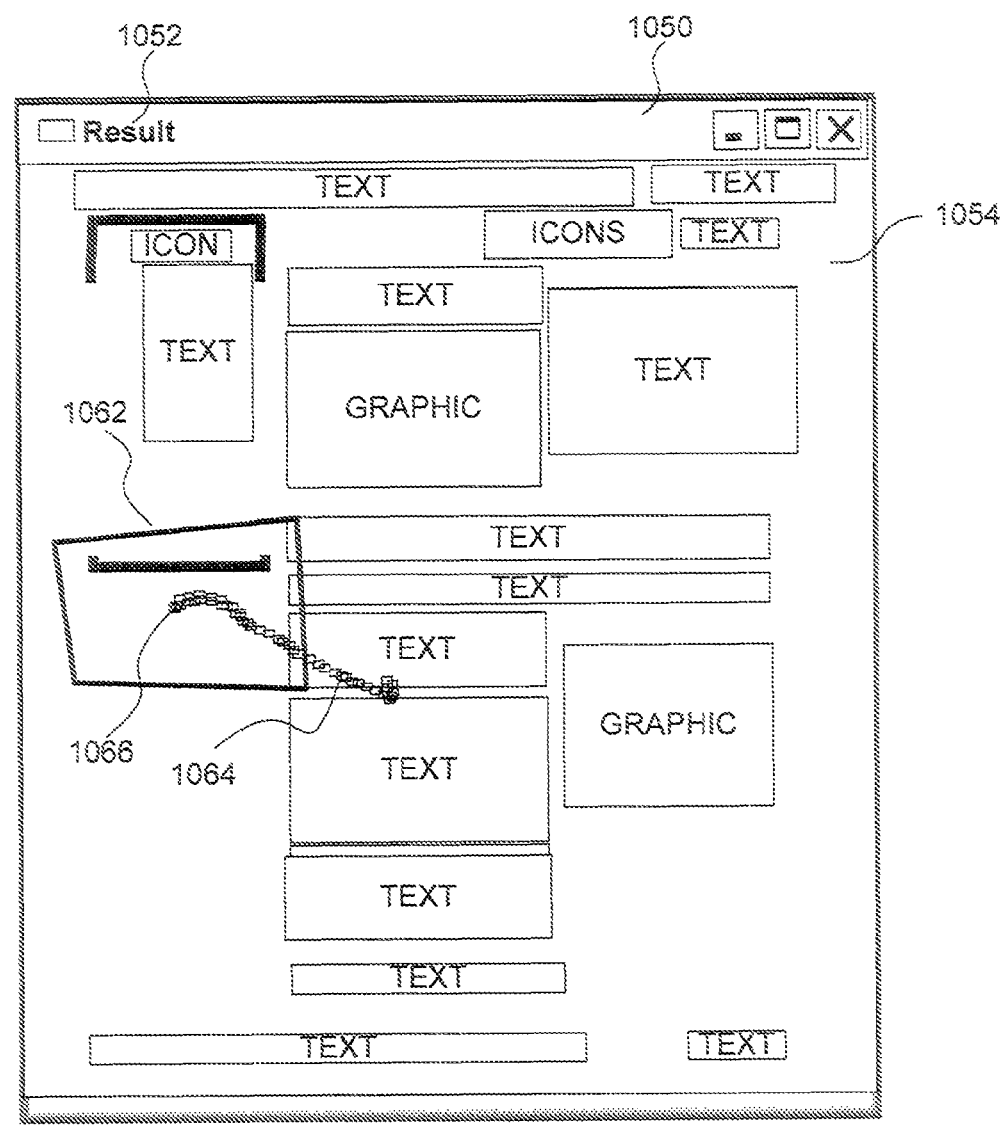

FIG. 10J illustrates the GUI showing another example of an initially unrecognizable image. This example illustrates how the recognition and tracking method of the present invention is particularly advantageous for images that contain both text content and graphical content. The initial unrecognizable image contains little text for performing feature extraction and feature retrieval. Referring now also to FIG. 10K, a GUI shows the results of combined recognition and tracking. While the viewing region 1062 was not initially recognizable, once the image frame has been recognized, the tracking of the present invention allows the GUI to show the tracking of the look-at-camera points. The tracking resolves the ambiguity issue as the input image has many hits in the database but tracking provides context cue so that the final output is unique. While the images are initially unrecognizable, once the image begins to include a sufficient amount of text to identify this document, the relative movement of the camera is captured images and provides modifications to the position of the viewing window 1062 as shown by the trajectory of the camera look at points 1064, 1066. Thus, as the viewing window moves from a point including a significant amount of text to a previously unrecognizable point having little text as shown in FIG. 10K, the point with little text becomes recognizable. This is particularly advantageous for documents that mix text and graphic images.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A method for recognizing and tracking a point and a viewing region of an electronic document using invisible junction features, the method comprising:
   receiving an input image;
   applying a distance transformation to generate invisible junctions within the input image;
   determining the point at one of the invisible junctions;
   retrieving a previous recognition result;
   processing the input image using the previous recognition result to identify the point and the viewing region within the electronic document page; and
   identifying an electronic document page corresponding to the input image based on the invisible junctions, the previous recognition result and the point.

2. The method of claim 1, wherein:
   receiving the input image includes receiving a plurality of input images;
   identifying the electronic document page comprises performing recognition on the plurality of input images; and
   wherein the previous recognition result is associated with the plurality of input images.

3. The method of claim 1, wherein the previous recognition result includes an estimated mode of an input device.

4. The method of claim 3, wherein the previous recognition result includes a user intention generated from an input device motion state.

5. The method of claim 3, wherein the mode of the input device is one from the group of hovering, scanning, zooming and abrupt change.

6. The method of claim 1, wherein processing the input image includes estimating a mode of an input device.

7. The method of claim 1, wherein the previous recognition result includes a tracking state of an input device.

8. The method of claim 7, wherein the tracking state is one from the group of a video tracking state, a recognizing state, a paper tracking state or a drift correcting state.

9. The method of claim 1, wherein processing the input image includes determining a current state of tracking.

10. The method of claim 1, wherein processing the input image includes:
estimating a mode of an input device;
determining a current state of tracking;
performing video tracking if an estimated mode of the input device is other than hovering; and
performing paper tracking if the electronic document page is recognized.

11. The method of claim 10, wherein performing video tracking includes tracking input device motion as a projective transformation across a plurality of video frames with a first video frame as a reference frame.

12. The method of claim 10, wherein performing paper tracking includes tracking input device motion with respect to paper with a paper plane acting as a reference frame.

13. The method of claim 1, wherein processing the input image includes correcting for drift.

14. The method of claim 1, wherein processing the input image includes estimating a feature orientation for determining the input image orientation.

15. The method of claim 1, further comprising displaying the point and the viewing region.

16. The method of claim 1, wherein the point and the viewing region are displayed overlaid upon a representation of the electronic document.

17. The method of claim 1, further comprising identifying the electronic document page a second time.

18. A system for recognizing and tracking a point and a viewing region of an electronic document using invisible junction features, the system comprising:
a processor;
a feature extraction unit stored on a memory and executed by the processor, the feature extraction unit for receiving an input image, applying a distance transformation to generate invisible junctions within the input image and determining the point at one of the invisible junctions;
a recognizer unit coupled to the feature extraction unit, the recognizer unit for retrieving a previous recognition result;
a tracker coupled to the recognizer unit, the tracker for processing the input image using the previous recognition result to identify the point and the viewing region within the electronic document page; and
a feature retrieval unit coupled to the tracker, the feature retrieval unit for identifying an electronic document page corresponding to the input image based on the invisible junctions, the previous recognition result and the point.

19. The system of claim 18, wherein the tracker creates a link between the input image and the point and viewing region on paper.

20. The system of claim 18, wherein the tracker estimates a feature orientation for determining the input image orientation.

21. The system of claim 18, wherein the previous recognition result includes an estimated mode of an input device.

22. The system of claim 18, wherein the previous recognition result includes a user intention generated from input device motion state.

23. The system of claim 18, wherein the previous recognition result includes a tracking state of an input device.

24. The system of claim 18, wherein the tracker is a video tracker having an input and an output for tracking input device motion as a projective transformation across a plurality of video frames with a first video frame as a reference frame, the input of the video tracker coupled to the output of the recognizer.

25. The system of claim 18, wherein the tracker is a paper tracker for tracking input device motion with respect to paper with a paper plane acting as a reference frame, the input of the paper tracker coupled to the output of the recognizer.

26. The system of claim 18, further comprising a drift corrector adapted for communication with the tracker, the drift corrector for correcting a link between paper and a video frame.

27. The system of claim 18, wherein the tracker outputs information usable to show the point and viewing region.

28. The system of claim 18, wherein the tracker outputs information for generating a representation of the electronic document overlaid with the point and the viewing region.

* * * * *